United States Patent [19]
Koch et al.

[11] Patent Number: 6,110,326
[45] Date of Patent: Aug. 29, 2000

[54] METHOD FOR CONCURRENT REACTION AND DISTILLATION OF FLUID STREAMS

[75] Inventors: David H. Koch, New York; Neil Yeoman, Merrick, both of N.Y.

[73] Assignee: Koch Engineering Company, Inc., Wichita, Kans.

[21] Appl. No.: 09/134,750

[22] Filed: Aug. 14, 1998

Related U.S. Application Data

[60] Division of application No. 08/376,046, Jan. 19, 1995, Pat. No. 5,855,741, which is a continuation-in-part of application No. 08/335,216, Nov. 7, 1994, Pat. No. 5,593,548, which is a continuation of application No. 07/962,266, Oct. 16, 1992, abandoned, which is a continuation-in-part of application No. 07/775,010, Oct. 11, 1991, Pat. No. 5,291,989, which is a division of application No. 07/475,971, Feb. 6, 1990, Pat. No. 5,108,550.

[51] Int. Cl.[7] ............................... B01D 3/32; B01D 3/34
[52] U.S. Cl. .................... 203/29; 203/1; 203/DIG. 6; 203/DIG. 9
[58] Field of Search .......................... 202/158; 203/29.1, 203/DIG. 6, DIG. 9; 422/191, 192, 193, 213, 216, 219, 214, 211; 261/146–148, 114.1

[56] References Cited

U.S. PATENT DOCUMENTS

| | | |
|---|---|---|
| 2,676,875 | 4/1954 | Barr . |
| 3,541,000 | 11/1970 | Hanson et al. . |
| 3,629,478 | 12/1971 | Haunschild . |
| 3,634,535 | 1/1972 | Haunschild . |
| 3,882,167 | 5/1975 | Lohmar et al. . |
| 4,126,539 | 11/1978 | Derr, Jr. et al. . |
| 4,213,847 | 7/1980 | Chen et al. . |
| 4,302,356 | 11/1981 | Smith, Jr. . |
| 4,307,254 | 12/1981 | Smith, Jr. . |
| 4,426,361 | 1/1984 | Bushnell . |
| 4,439,350 | 3/1984 | Jones, Jr. . |
| 4,443,559 | 4/1984 | Smith, Jr. . |
| 4,470,931 | 9/1984 | Callahan et al. . |
| 4,471,154 | 9/1984 | Franklin . |

(List continued on next page.)

FOREIGN PATENT DOCUMENTS

| | | |
|---|---|---|
| 402019 | 12/1990 | European Pat. Off. . |
| 0470655 | 2/1992 | European Pat. Off. . |
| 0 571 163 | 11/1993 | European Pat. Off. . |
| 2437239 | 4/1980 | France . |
| 872938 | 4/1953 | Germany . |
| 2034597 | 6/1980 | United Kingdom . |
| WO 94 08681 | 4/1994 | WIPO . |

OTHER PUBLICATIONS

Patent Abstracts of Japan, vol. 8, No. 279, (C–257) [1976], Dec. 20, 1984; & JP–A–59 147 632 (Mitsui Zousen Engineering) 24–08–1984.

Primary Examiner—Virginia Manoharan
Attorney, Agent, or Firm—Shook, Hardy & Bacon L.L.P.

[57] ABSTRACT

A method for operating a column having a region for reaction with distillation of fluid streams is provided with structures including catalyst-filled containers having liquid permeable upper surfaces which allow for the accumulation and flow of liquid from a liquid stream. The containers include catalyst beds positioned beneath the upper surface of the containers. A portion of the liquid on the containers is driven through the catalyst bed by the liquid head created by the accumulated liquid and is catalytically reacted. Another portion of the liquid may be directed through a downcomer which allows the accumulated liquid to leave the container without passing through the catalyst bed so that higher volumetric flow rates can be achieved.

12 Claims, 15 Drawing Sheets

U.S. PATENT DOCUMENTS

| | | |
|---|---|---|
| 4,536,373 | 8/1985 | Jones, Jr. . |
| 4,540,831 | 9/1985 | Briggs . |
| 4,579,647 | 4/1986 | Smith . |
| 4,597,947 | 7/1986 | Almaula . |
| 4,620,952 | 11/1986 | Hsieh . |
| 4,623,454 | 11/1986 | Tauscher et al. . |
| 4,722,780 | 2/1988 | Franck et al. . |
| 4,731,229 | 3/1988 | Sperandio . |
| 4,836,989 | 6/1989 | Aly et al. . |
| 4,842,778 | 6/1989 | Chen et al. . |
| 4,847,431 | 7/1989 | Nocca et al. . |
| 5,026,459 | 6/1991 | Quang et al. . |
| 5,073,236 | 12/1991 | Gelbein et al. . |
| 5,130,102 | 7/1992 | Jones, Jr. . |
| 5,141,861 | 8/1992 | Dale . |
| 5,262,094 | 11/1993 | Chuang . |
| 5,275,790 | 1/1994 | Buchholz et al. ................ 422/217 |
| 5,308,451 | 5/1994 | Carland . |
| 5,366,666 | 11/1994 | Chuang et al. . |
| 5,368,691 | 11/1994 | Asselineau et al. . |
| 5,389,343 | 2/1995 | Gentry . |
| 5,449,501 | 9/1995 | Luebke et al. . |
| 5,496,446 | 3/1996 | Yeoman et al. . |
| 5,939,031 | 8/1999 | Ellis et al. ........................ 422/194 |

METHOD FOR CONCURRENT REACTION AND DISTILLATION OF FLUID STREAMS

This is a divisional of application Ser. No. 08/376,046 filed on Jan. 19, 1995, now U.S. Pat. No. 5,855,741: which is a continuation-in-part of U.S. application Ser. No. 08/335,216, filed on Nov. 7, 1994, now U.S. Pat. No. 5,593,548, which is a continuation of U.S. application Ser. No. 07/962,266 filed on Oct. 16, 1992, now abandoned, which is a continuation-in-part of U.S. application Ser. No. 07/775,010, filed on Oct. 11, 1991, now U.S. Pat. No. 5,291,989, which is a division of U.S. application Ser. No. 07/475,971, filed on Feb. 6, 1990 now U.S. Pat. No. 5,108,550.

BACKGROUND OF THE INVENTION

This invention relates in general to a reaction with distillation column in which mass transfer and chemical reaction occur within the same general region within the column, and, more particularly, to a structure within the column which allows such mass transfer and chemical reaction to occur. The invention also relates to a process employing a plurality of such structures.

Various structures have been suggested for use in processes wherein concurrent reaction with distillation of fluid streams is desired. One such type of reaction with distillation structure employs a distillation tray and a downcomer which extends between adjacent distillation trays and is packed with catalyst particles to form a catalyst bed. The distillation tray facilitates mass transfer between the liquid and vapor streams while the catalyst bed in the downcomer causes the liquid stream to undergo catalytic reaction as it descends between trays. In the design of this type of structure as illustrated in U.S. Pat. Nos. 3,629,478 and 3,634,535 to Haunschild, all of the downwardly flowing liquid stream is channeled through the downcomer as it descends between adjacent trays.

Forcing all of the liquid to flow through the packed downcomer in the structure described above can be advantageous in certain applications because liquid feed is continually presented to the catalyst and the reaction product is removed from the catalyst surface at a rate fast enough to ensure that the reaction product does not inhibit the effectiveness of the catalyst. In many applications, however, it may be unnecessary to force all of the descending liquid through the packed downcomer because the desired chemical reaction can be accomplished by bringing only a portion of the liquid stream into contact with the catalyst. In such applications, the use of the packed downcomer structure as described may be undesirable because the liquid flow rate that can be achieved in the column is limited by the permeability of the catalyst bed.

Another type of conventional catalytic reaction with distillation structure employs a cloth belt which is supported by a steel wire support structure and has a plurality of pockets filled with catalyst. U.S. Pat. Nos. 4,307,254 and 4,302,356 to Smith provide examples of structures of this type. The hydraulic characteristics of a reaction with distillation process which employs the cloth belt can be much higher than when the previously described packed downcomer is used because all of the descending liquid stream is not forced to flow through the catalyst pockets. Instead, the liquid stream is free to flow through the open areas surrounding the cloth belt.

The catalyst in the cloth belt structure previously described is wetted by the liquid soaking through the cloth covering and diffusing through the catalyst. Because the liquid is not forced through the catalyst in the cloth belt structure, the reaction products may in some instances be removed too slowly from contact with the catalyst. The catalyst effectiveness or reactivity in the cloth belt may thus be less than desired in certain applications.

In other applications in which the cloth belt is used, the column region containing the cloth belt may be flooded with liquid to enhance the catalytic reaction of the liquid. Because of the flooded conditions in that portion of the column, mass transfer between the liquid and vapor streams is substantially impeded. Provisions must then be made for allowing distillation to occur elsewhere within the column and the vapor stream must be bypassed around the flooded region. The cloth belt in those applications thus functions primarily as a reaction structure and not a combination reaction with distillation structure.

A still further example of a conventional reaction with distillation structure employs a packing such as in the form of corrugated plates which have a catalyst bed formed between pairs of adjacent plates. Multiple pairs of plates are then arrayed in alternating directions to form liquid and vapor flow channels in the troughs of the plates. This "sandwich" type construction can provide very high mass transfer rates because it causes more uniform distribution of and contact between the liquid and vapor streams. Hydraulic performance can also be very high because the flow channels allow most of the liquid stream to bypass the catalyst. In addition to the favorable mass transfer and hydraulic characteristics, the sandwich construction provides increased catalyst effectiveness because a portion of the liquid stream is forced through the catalyst beds at a rate which facilitates removal of the reaction product from contact with the catalyst.

Although the sandwich construction can provide better processing performance than either the downcomer or cloth belt structures previously described, it can also be much more expensive than those structures and economic considerations may prevent the use of the sandwich construction in many applications. A need has thus arisen for a more economical reaction with distillation structure that provides the desired reactivity as well as mass transfer and hydraulic performance so that the structure can be used in a greater range of chemical processing applications.

SUMMARY OF THE INVENTION

It is an object of this invention to provide, in a process column, a reaction with distillation structure which forces a portion of a descending liquid stream through a catalyst bed to continually present fresh liquid feed to the catalyst for reaction and to continually remove the reaction product from contact with the catalyst so that it does not impede reaction of the liquid feed, but which structure also allows another portion of the liquid stream to bypass the catalyst bed so that the desired liquid flow rate through the column can be achieved.

It is another object of this invention to provide a process in which a reaction with distillation structure is used to effect mass transfer between liquid and vapor streams and, in addition, provide the desired reactivity and hydraulic performance by causing a portion of the descending liquid stream to be driven through a catalyst bed while allowing another portion of the liquid stream to bypass the catalyst bed as it flows between adjacent reaction with distillation structures.

It is also an object of this invention to provide a reaction with distillation structure that provides the desired mass transfer performance while forcing only a portion of a liquid stream through a catalyst bed so that the desired hydraulic performance can be achieved.

It is a further object of this invention to provide a reaction with distillation structure constructed to provide the desired reactivity, mass transfer and hydraulic performance at a cost low enough to allow the structure to be economically used in many different types of reaction with distillation processes.

It is a still further object of this invention to provide a reaction with distillation structure which allows liquid to flow substantially horizontally through a catalyst bed as it descends between adjacent structures so that reduced resistance to flow can be achieved by reducing the distance of travel of the liquid through the catalyst bed and increasing the surface area of the catalyst bed which is open to fluid flow.

It is yet another object of this invention to provide a reaction with distillation structure which divides the catalyst bed among multiple containers so that the resistance to fluid flow through the divided catalyst beds is substantially reduced, including to the extent that the catalyst beds can accommodate all of the desired volume of liquid flow through the column containing the reaction with distillation structure.

To accomplish these and other related objects, in one aspect the invention is directed to a structure for use in a mass transfer column to facilitate mass transfer between liquid and vapor streams flowing through the column and to concurrently effect catalytic reaction of the liquid stream, said structure comprising a horizontally elongated container for placement within said column to receive a liquid stream, said container being sized to fill a substantial portion of a horizontal cross section of the column and comprising an upper surface across which said liquid stream may flow, a lower surface spaced below said upper surface, and a catalyst bed retained between said upper and lower surfaces. The upper and lower surfaces of the container are permeable to the vertical flow of said liquid stream to allow at least a first portion of said liquid stream on said upper surface to pass downwardly through the upper surface to enter said catalyst bed under the influence of gravity for catalytic reaction and to allow said liquid stream to pass downwardly through the lower surface from the catalyst bed to exit the container. The container further includes a plurality of passages extending through the upper surface, catalyst bed and lower surface of the container to allow upward passage of the vapor stream through the container for interaction and mass transfer with the liquid stream on the upper surface of the container. In one embodiment, the passages are sized to prevent downward passage of liquid and a downcomer is positioned in relation to the container to allow a second portion of the liquid stream on the upper surface of the container to enter the downcomer and pass downwardly from the upper surface without passing through the catalyst bed. In another embodiment, the passages are sized to allow downward passage of liquid concurrently with upward passage of vapor. In such embodiment, the downcomer would be optional. A weir may optionally be positioned to cause said liquid stream to accumulate on said upper surface of the container and develop a liquid head which forces said first portion of the liquid stream downwardly through the container.

In another aspect, the invention is directed to a process for operating a column containing a plurality of the vertically spaced apart reaction with distillation structures to effect concurrent catalytic reaction of a liquid stream and mass transfer between the liquid stream and a vapor stream. The process includes the steps of supplying a liquid stream to one of said reaction with distillation structures and flowing said liquid stream across the upper surface of the associated container, directing a first portion of the flowing liquid stream downwardly through said container and catalyst bed for catalytic reaction to form a reaction product, directing a second portion of said flowing liquid stream downwardly through said downcomer to an underlying reaction with distillation structure, flowing at least part of said first and second portions of the liquid stream across the underlying reaction with distillation structure after passage of said first portion through said catalyst bed and said second portion through the downcomer or the passages, and directing a vapor stream upwardly through said passages in the containers for interaction and mass transfer with the liquid stream on the upper surfaces of the containers.

BRIEF DESCRIPTION OF THE DRAWINGS

In the accompanying drawings which form a part of the specification and are to be read in conjunction therewith and in which like reference numerals are used to indicate like parts in the various views.

DESCRIPTION OF THE PREFERRED EMBODIMENTS

Figure 1:
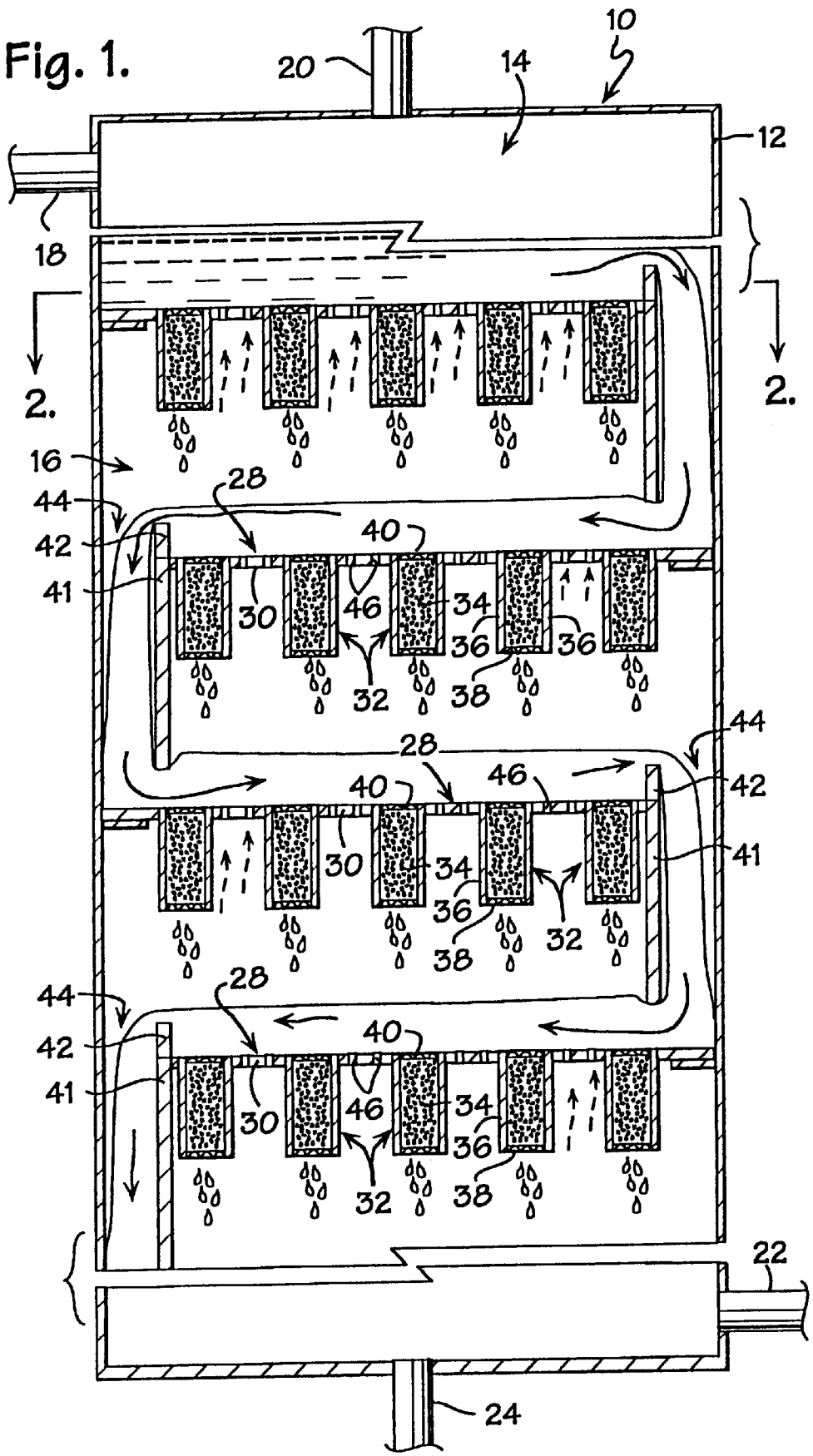
FIG. 1 is a fragmentary side elevation view of a reaction with distillation column containing a first embodiment of a reaction with distillation structure in accordance with the present invention and taken in vertical section.

Referring now to the drawings in greater detail, and initially to FIG. 1, a reaction with distillation column in accordance with the present invention is represented broadly by the numeral 10. Column 10 may be any of various types of distillation columns and mass transfer reactors and includes an external upright shell 12 which may be of cylindrical, rectilinear or other desired configuration. While the column 10 has been shown as rectilinear for purposes of illustration, in commercial applications the column will typically be of cylindrical construction. A generally open internal chamber 14 is formed within shell 12 and includes a reaction with distillation region 16 in which both mass transfer and chemical reaction occur concurrently. Typically, the column 10 will include one or more other regions in which other processing such as distillation and/or other mass transfer processes occur. These additional regions may be above and/or below reaction with distillation region 16. In addition, multiple reaction with distillation regions 16 may be provided and may be separated by regions in which only mass transfer occurs.

Column 10 includes an upper inlet pipe 18 for directing a fluid stream, typically a liquid stream, within the shell 12 and into an upper portion of chamber 14. An upper outlet pipe 20 is provided for removing a vapor stream from the chamber 14 as an overhead. An inlet pipe 22 in a lower portion of chamber 14 allows for charging of a fluid stream such as a vapor stream to the column 10. A lower outlet pipe 24 is positioned in shell 12 for removal of a liquid bottoms. Additional inlet and outlet pipes and other column components such as reboilers and the like may also be provided.

A distributor (not shown) may optionally be utilized to feed a liquid stream into the reaction with distillation region 16. Any of various suitable types of collectors (not shown) may also be provided to collect the liquid stream from an upper region adjacent region 16 and feed it to the distributor. Similarly, the liquid stream leaving the region 16 may be collected by a device which feeds the liquid stream to an underlying region such as one in which only distillation occurs.

In accordance with the present invention, a plurality of reaction with distillation structures designated generally by the numeral 28 are provided within region 16. Each structure 28 includes a tray 30 and a plurality of spaced apart containers or troughs 32 which are coupled with tray 30 and extend downwardly therefrom. Each tray 30 is disposed generally horizontally and is suitably supported, such as on shell 12. The troughs 32 are filled with catalyst particles 34 and can be of any suitable cross-sectional configuration. As illustrated, the troughs 32 are generally rectilinear and extend in parallel rows between the opposed sides of shell 12. The longitudinal horizontal axes of troughs 32 in one structure 28 are shown in parallel orientation to the same axes of troughs 32 in adjacent structures 28. The orientation, however, may be varied anywhere between parallel and a 90° angle. It will also be appreciated that the troughs 32 need not extend completely between the opposed sides of the shell and in some applications it may be preferred that they do not. As another example, the catalyst filled troughs 32 can be generally cylindrical and can be arrayed in a predetermined pattern on the tray 30. Various other configurations and arrangements are possible and are within the scope of the invention.

Each of the troughs 32 includes parallel side walls 36 and parallel end walls 37 (FIG. 2) which are joined together. A bottom 38 and a cover 40 are joined to the side walls 36 and end walls 37 to complete the rectilinear enclosure. The side walls 36 are suitably connected to the tray 30 in a manner such that cover 40 is coplanar with tray 30. The cover 40 may be removable to allow for the loading of the catalyst particles 34 into the trough 32.

The cover 40 is formed of perforate material such as screening or other mesh-like material which allows for the passage of liquid from the tray 30 into the trough 32. The interstitial openings in the cover 40 should be sized small enough to prevent the catalyst particles 34 from passing through the cover. The bottom 38 and/or at least the lower portion of side walls 36 is also perforate to allow for the removal of liquid from within trough 32. Again, the openings in the bottom 38 or side walls 36 should be sized to prevent passage of the catalyst particles.

In order to prevent interference with the horizontal flow of liquid on trays 30, the bottom 38 of each trough 32 is preferably spaced from the underlying tray 30 so that it is not in contact with liquid which accumulates on that underlying tray. In certain constructions, however, such as when troughs 32 are of a cylindrical configuration or when they do not extend all the way across the tray, it may be desirable for the troughs 32 to extend downwardly into contact with the underlying tray 30 or at least below the top surface of the liquid accumulating on that tray.

Each structure 28 also includes a downcomer plate 41, an upper portion of which functions as an overflow weir 42, positioned on the tray 30 downstream from the catalyst troughs 32. The weir 42 serves to cause accumulation of liquid on the tray 30 to a preselected depth before it overflows the weir 42. That portion of the liquid that overflows weir 42 flows through a bypass or downcomer 44 to the next lower reaction with distillation structure 28. The downcomer 44 may comprise any of various suitable devices for accommodating the flow of fluid and extends downwardly with a lower end spaced above the underlying tray 30. In some applications it may be desirable for the lower end of the downcomer 44 to extend below the level of the liquid on the underlying tray 30, while in other applications the downcomer lower end may terminate above the liquid level on the underlying tray. The downcomer 44 as illustrated is rectilinear in configuration with one wall being formed by plate 41 and the other walls being formed by the column shell 12. It will be appreciated that the downcomer 44 can assume many other configurations and can be formed in other suitable fashions. For example, when the troughs 32 are of cylindrical configuration, the downcomer 44 may be formed within one or more, including all, of the troughs 32. In such instances, the downcomer 44 would be centrally positioned and would extend generally from the top to the bottom of each trough. The catalyst bed would then fill the annular region surrounding the downcomer and would be generally ring-shaped in cross-section. A portion of the liquid entering the top of the downcomer in this configuration would pass downwardly through the downcomer without entering the catalyst bed while another portion would be forced from the downcomer through the catalyst-bed.

In another configuration, the troughs 32 could be rectilinear as illustrated but the downcomer would be formed within one or more, including all, of the troughs 32. The downcomers could be rectilinear or cylindrical in configuration and each would be generally centrally positioned and would extend from the top to the bottom of the associated trough 32. The bottom of the downcomer could also be closed by an imperforate or partially perforate plate to prevent or reduce liquid flow out of the bottom of the downcomer. All or a portion of the liquid entering the downcomer would then be forced to flow through the surrounding catalyst bed as it is removed from the trough. Variations of this configuration will be subsequently described with reference to other figures in the drawings, and particularly with reference to FIG. 8.

The structures 28 are arranged in the column 10 so that the liquid which flows through any downcomer 44 must then travel back across the-surface of the underlying tray 30 to reach the next downcomer 44 in the underlying structure 28, the direction of flow being illustrated by solid arrows in FIG. 1. Forcing the liquid to flow back and forth in this manner allows it to more thoroughly interact with vapor which is brought into contact with the liquid on the trays 30.

Figure 2:
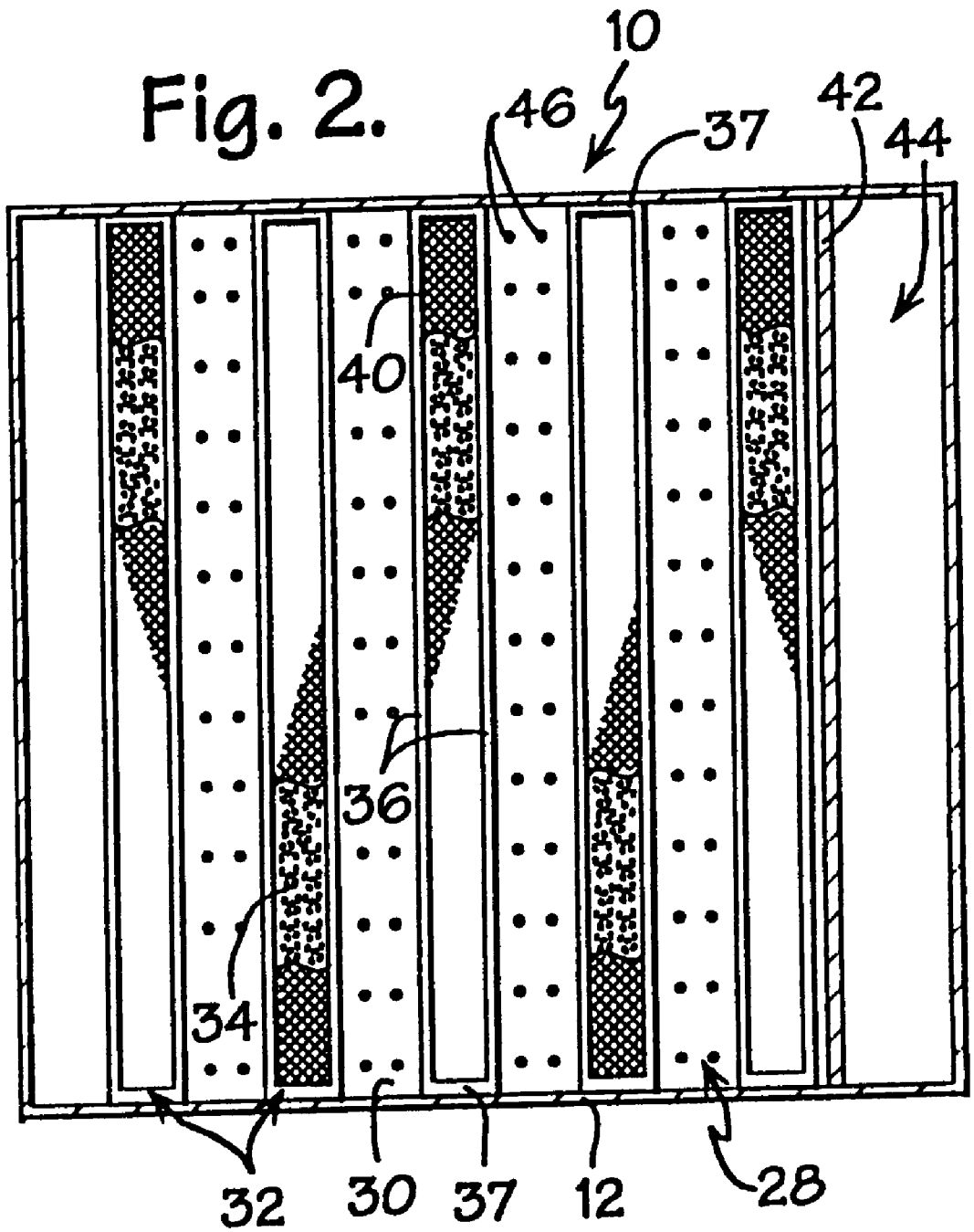
FIG. 2 is a top plan view of a reaction with distillation structure of the present invention and of the type shown in the column of FIG. 1, the view being taken in horizontal section along line 2—2 of FIG. 1.

As can be seen in FIG. 2, each of trays 30 includes a plurality of apertures 46 which extend through the tray 30 in those portions of the tray between troughs 32. The apertures 46 are sized and positioned to allow the passage of ascending vapor (as indicated by the upwardly directed broken arrows in FIG. 1) during operation of column 10. The vapor as it rises through the trays 30 is able to contact the accumulating liquid on the trays 30 for interaction therewith. Mass transfer between the liquid and vapor streams can thus occur on trays 30 and also in the open area surrounding the troughs 32 as the ascending vapor contacts the descending liquid.

The pressure differential that drives the vapor through the apertures 46 in trays 30 also serves to prevent the downward flow of liquid through the apertures 46. It will be appreciated that other types of devices may be used in place of or with apertures 46 to allow passage of the vapor through the trays 30. Examples of these alternatives include bubble caps and valves. In certain applications the use of these and other alternative devices may be preferred.

The catalyst particles 34 packed in troughs 32 form permeable catalyst beds in which catalytic reaction of liquid occurs. The catalyst particles 34 may be formed of any suitable catalyst desired for a particular catalytic reaction process occurring within column region 16. The catalyst may be an acidic or basic catalyst or may comprise catalytic metals and their oxides, halides or other chemically reacted states. Molecular sieves may also be utilized as the catalyst. The catalyst should be heterogeneous with the system reaction and the fluids charged to the column 10. By way of example, acid cation exchange resins may be used for dimerization, polymerization, etherification, esterification, isomerization, and alkylation reactions. Other catalysts such as molecular sieves, magnesia, chromia and brucite may be used for isomerization reactions.

The catalyst particles 34 can be cylindrically shaped extrudates or can be in the form of small beads or the like or may comprise irregularly shaped granules or fragments. The term "particles" as used herein is intended to encompass all of the foregoing. The size of the catalyst particles may be varied depending upon the requirements of the particular applications. It will also be appreciated that the catalyst particles 34 could be formed into a porous slab instead of being packed in troughs 32. The need to provide an enclosure to house the catalyst particles would thus be eliminated. This is contemplated by and is within the scope of the invention.

In a method in accordance with the present invention, a fluid stream, preferably comprising a liquid stream, is charged to the column 10 such as through upper inlet pipe 18. The liquid stream may optionally pass through one or more regions, such as distillation zones, before it is fed to the reaction with distillation region 16. A vapor stream may also-be charged to the column 10, such as through lower inlet pipe 22, and then directed to region 16. The vapor stream may, if desired, be directed through one or more intermediate regions. Alternately, the vapor stream may be generated within one or more regions below reaction with distillation region 16.

The liquid stream is charged to the uppermost reaction with distillation structure 28 and then flows across and accumulates on the associated tray 30 at flow rates which exceed the permeability through troughs 32. A first portion of the accumulating liquid is able to flow through the covers 40 of the catalyst filled troughs 32 and descend through the catalyst beds formed by the catalyst particles 34. Because the liquid accumulating on the tray 30 creates a liquid head, the liquid is continually forced through troughs 32 with a pressure determined by the liquid head. This pressurized flushing action constantly presents fresh liquid feed to the catalyst and removes the reaction product from contact with the catalyst. The catalyst is thus able to operate at high efficiencies, including near theoretical efficiency in certain processes.

Another portion of the liquid accumulating on each tray 30 is allowed to overflow the weir 42 and enter the downcomer 44 for passage to the underlying tray 30. The liquid traveling through downcomer 44 is thus able to descend between the trays without having to pass through the catalyst filled troughs 32. The use of downcomers 44 in this manner allows the hydraulic capacity of the column 10 to greatly exceed that of columns in which all of the liquid must pass through the catalyst bed.

The ratio of liquid which flows through troughs 32 to that which flows through downcomer 44 can, of course, vary widely depending upon the particular requirements of individual processes occurring within the column region 16. The amount of liquid passing through the catalyst troughs 32 will, in some applications, be selected to maximize the reactivity of the catalyst. As more liquid flows through the catalyst troughs 32, however, the average effective flow path of liquid across trays 30 and the residence time of the liquid on the trays is reduced. As a result, the effectiveness of the vapor-liquid interaction on the trays in reduced. Accordingly, the amounts of liquid flowing through troughs 32 and downcomer 44 must be balanced to achieve the mass transfer and catalytic efficiencies desired for particular processes.

As liquid exits the catalyst troughs 32, it may further contact and interact with the vapor stream ascending through the surrounding open space. The amount of liquid and vapor interaction which occurs in the open area surrounding the troughs 32 will typically be less than that which takes place as the vapor stream passes through the apertures 46 in trays 30 and bubbles through the liquid which is on the trays 30. It will be appreciated that liquid and vapor interaction in the open area surrounding the troughs 32 can be increased if desired by the placement of packing in such area. The packing may comprise any of various suitable plate-like, ring type or saddle type packing or other structures which are commercially or otherwise available.

It can thus be appreciated that the reaction with distillation structures 28 can accommodate a large volumetric flow rate of the liquid stream while still providing for high reactivity and mass transfer performance. The downcomer 44 on each tray 30 allows the increased flow rate to occur by permitting liquid to flow between the trays 30 without having to first pass through the catalyst beds provided in troughs 32. That portion of the liquid which does not reach the downcomer 44 enters troughs 32 under pressure from the liquid head developed by the liquid accumulating on the associated tray 30. This pressure causes more uniform and rapid distribution of the liquid throughout the catalyst bed and results in increased catalyst efficiency by removing the reaction product from contact with the surface of the catalyst. Mass transfer is also facilitated by causing the liquid stream to flow back and forth across descending levels of trays 30 where it is forced to interact with the vapor which is bubbling through the tray apertures 46.

Figure 3:
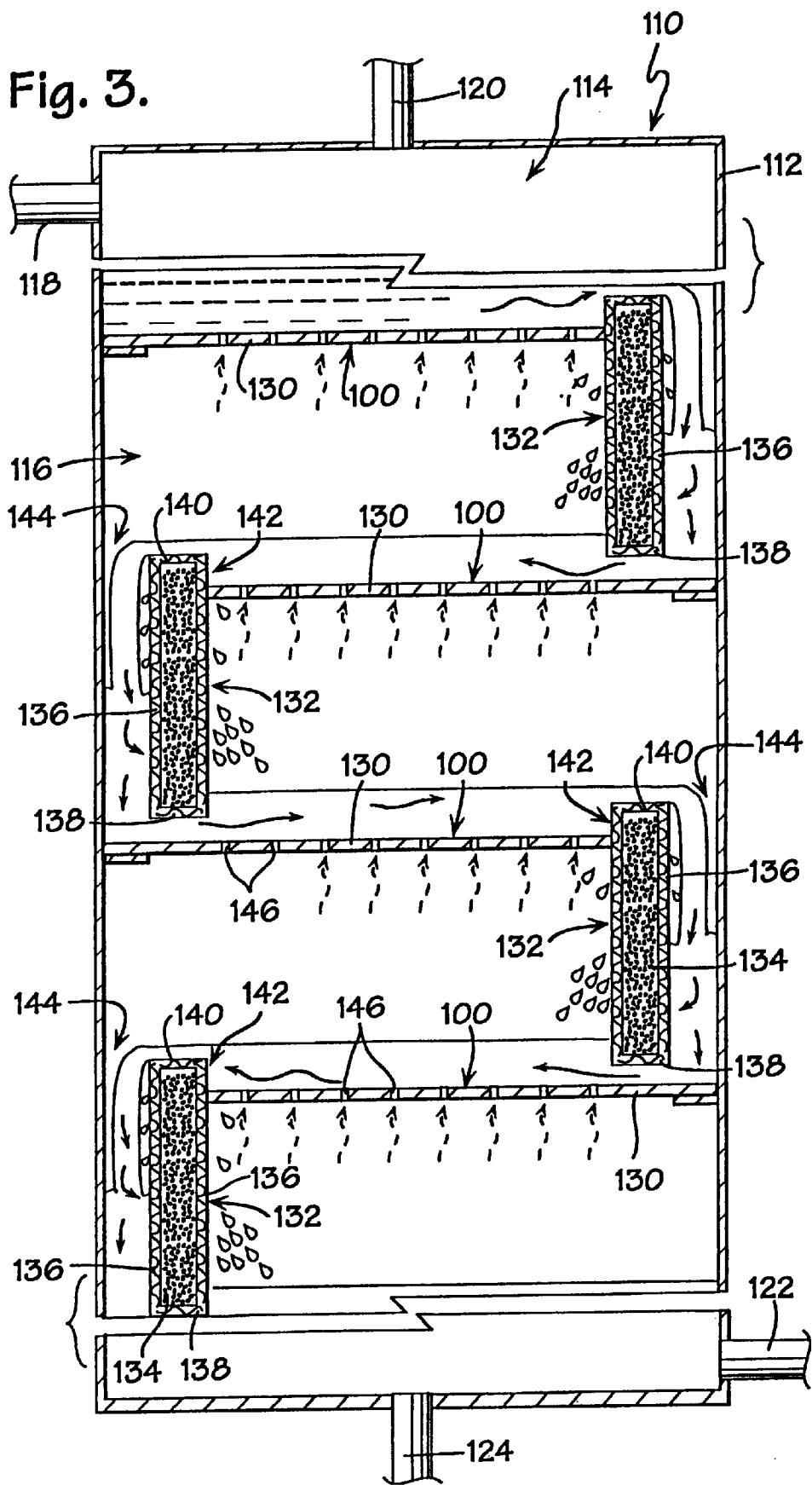
FIG. 3 is a fragmentary side elevation view of a column taken in vertical section and similar to that shown in FIG. 1 but employing another embodiment of a reaction with distillation structure in accordance with the present invention.

Turning now to FIG. 3, an alternate embodiment of a reaction with distillation structure is broadly designated by the numeral 100. A plurality of such structures 100 are shown applied within a column 110 which may be of the same type as column 10 previously described. Portions of column 110 which correspond to like portions described with respect to column 10 have been assigned like numerals preceded by the prefix "1". A detailed description of those portions will not be repeated herein.

A plurality of the reaction with distillation structures 100 are arrayed in successive layers within the reaction with distillation region 116 of column 110. Each structure 100 comprises a tray 130 which is suitably supported, such as on the column shell 112, and a catalyst filled trough or container 132 which is disposed at one end of tray 130. Containers 132 are similar to troughs 32 previously described in that each is filled with catalyst particles 134 which form a catalyst bed for the catalytic reaction of liquid. Each container 132 likewise has a pair of side walls 136, a pair of end walls (not shown), a bottom 138 and a cover 140.

The containers 132 may extend completely or partially between opposed sides of shell 112. The container 132 in each structure is shown oriented parallel to containers in adjacent structures. Such orientation may, however, be varied between parallel and 90°.

Unlike the troughs previously described, a single container 132 is positioned at the end of each tray 130 and extends upwardly above as well as downwardly below the surface of the tray 130. That portion of each container 132 which extends above the tray 130 functions as an overflow weir 142 which causes the accumulation of liquid on tray 130. The container side wall 136 which is closest to the shell 112 also forms part of a bypass or downcomer 144 into which the liquid overflows from tray 130 and is directed to the underlying tray 130. The remaining walls of the downcomer 144 are formed by the walls of column shell 112. The downcomer 144 is not limited to the described construction and configuration but may comprise any of various suitable devices for accommodating the flow of liquid.

The cover 140 and sidewalls 136 of each container 132 are made of perforate material such as screen or mesh which is capable of retaining the catalyst particles 134 but permitting the ready passage of fluids. The bottom 138 is also shown as being formed of perforate material but it may alternately be formed of imperforate material.

The tray 130 includes a plurality of apertures 146 which accommodate the upward passage of vapor but generally do not permit the downward passage of liquid during operation of column 110. Alternative devices such as the bubble caps and valves previously mentioned may be substituted for apertures 146 to perform the same function.

The catalyst filled containers 132 extend downwardly below the associated tray 130 a sufficient distance so that the lower portion of each container 132 extends below the surface of the liquid on the underlying tray 130. When a sufficient liquid flow rate is established, the containers 132 thus cause liquid to back up in each downcomer 144. This backing up of liquid, which is normal for trays, is particularly advantageous because it creates a liquid head which forces liquid through the lower portion of the container 132 and the associated catalyst bed in a generally horizontal direction. Liquid which flows laterally through catalyst containers 132 travels a much shorter distance than liquid which enters the containers 132 through covers 140 and travels downwardly through the containers. The overall resistance to fluid flow through the catalyst containers 132 is thereby reduced by the use of the liquid head to drive a portion of the liquid laterally through the container 132. This results in an increase in the hydraulic capacity of the containers 132 above that which could ordinarily be accomplished by forcing all of the liquid to flow downwardly from the top towards the bottom of the catalyst bed within each container 132. Because the resistance to flow is directly proportional to the distance through which the liquid flows and is inversely proportional to the cross-sectional area of flow, it can be readily appreciated that the flow of liquid laterally through the containers 132 can significantly reduce the resistance to liquid flow.

Structures 100 function in a similar manner to those previously described with respect to column 10. Mass transfer resulting from vapor and liquid interaction occurs as the vapor bubbles upwardly through the apertures 146 and mixes with the liquid flowing across trays 130. The catalyst in containers 132 operates at high efficiency because liquid is forced through the catalyst bed not only by the liquid head developed by the liquid accumulating on each tray 130 and the liquid cresting over weir 142 but also by the backing up of liquid in downcomer 144. Greater liquid flow rates through column 110 can be achieved with the use of the open downcomer 144 than would otherwise be possible if all of the liquid were forced to flow through a catalyst packed downcomer. Notably, the hydraulic capacity of the catalyst containers is also enhanced by causing liquid to back up in downcomers 144 and exert a horizontally directed pressure which causes liquid to flow laterally into the containers 132 through the permeable side wall 136 adjacent the associated downcomer.

Figure 4:
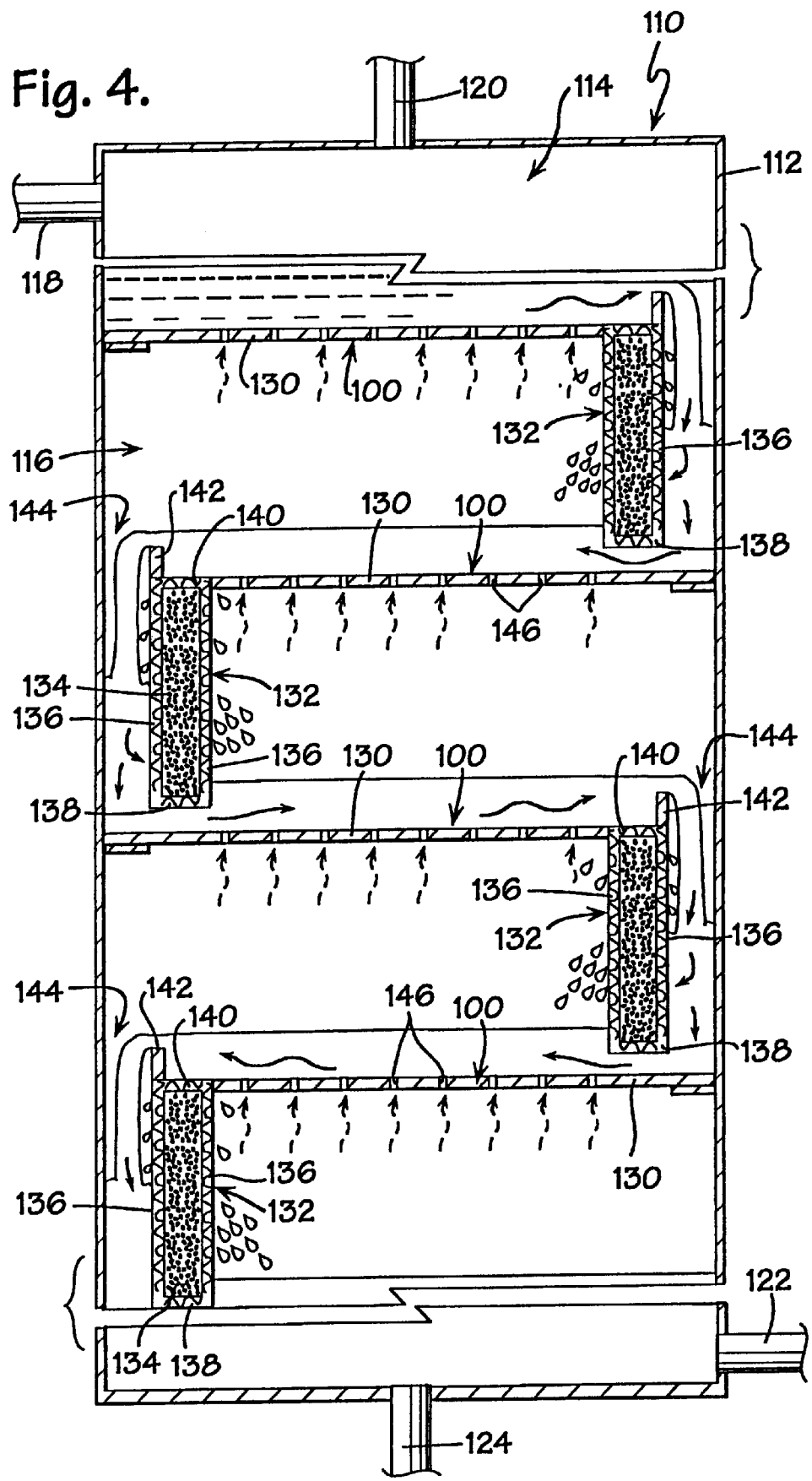
FIG. 4 is a fragmentary side elevation view of a column taken in vertical section and showing a reaction with distillation structure similar to that shown in FIG. 3 but with the tops of the catalyst containers shown level with the associated trays and plate-type overflow weirs being provided to cause liquid to accumulate on the trays.

It will be appreciated that the reaction with distillation structures 100 can be modified and still achieve the objectives of and be encompassed by the present invention. One such modification is illustrated in FIG. 4, where the catalyst containers 132 do not extend upwardly beyond the upper surface of trays 130. Instead, the container cover 140 is generally coplanar with the tray 130 and a solid plate 142 extends upwardly beyond the cover and functions as an overflow weir which causes the accumulation of liquid on tray 130. The plate 142 is shown in vertical alignment with the downstream side wall 136 of container 132 so that a portion of the liquid accumulating on tray 130 is forced through the container cover 140. Alternatively, the plate 142 could be located on the opposite or upstream side wall 136 so that liquid would enter the container 132 through cover 140 only after spilling over plate 142.

Figure 5:
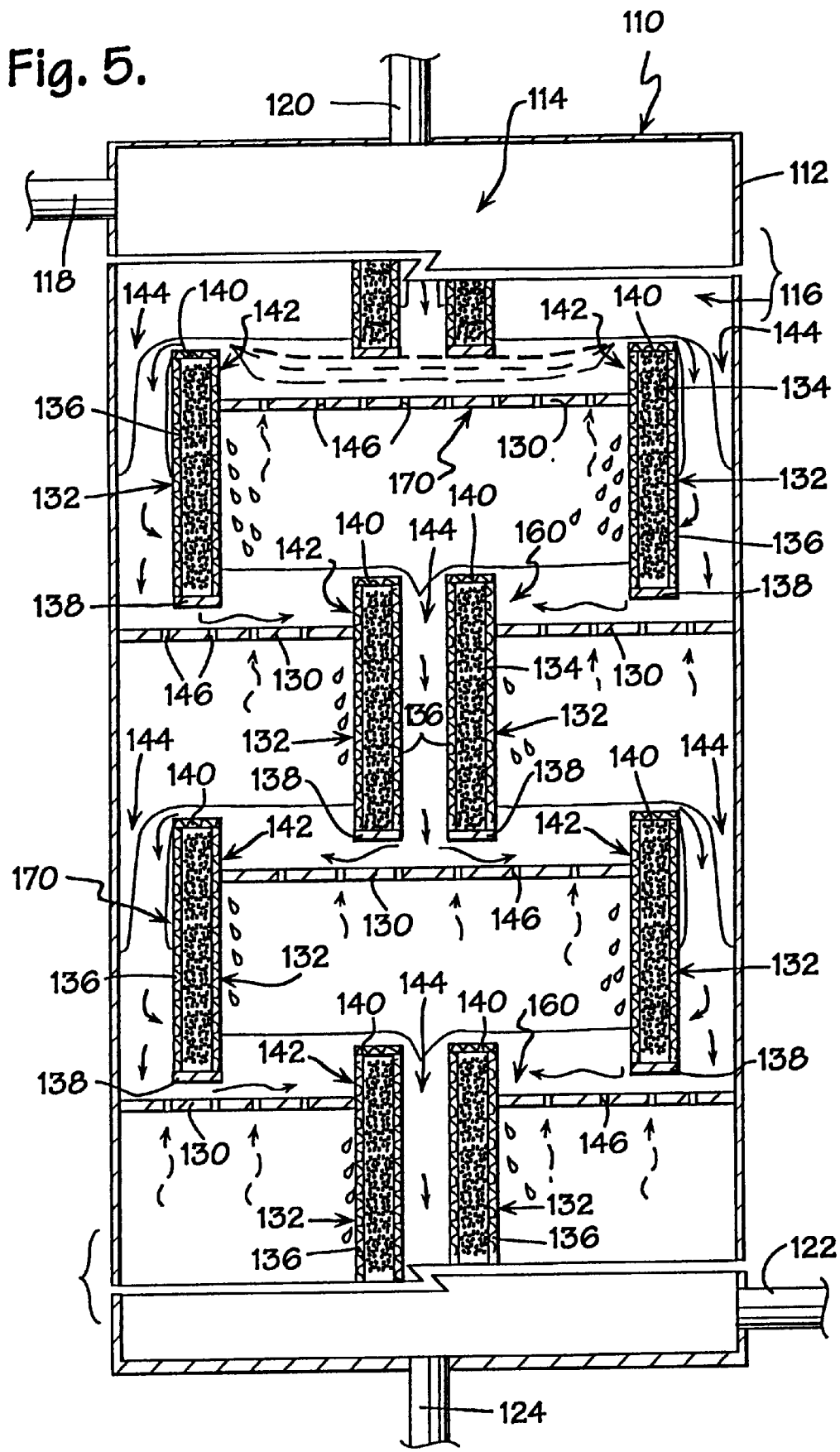
FIG. 5 is a fragmentary side elevation view of a column taken in vertical section and showing a double-pass version of the reaction with distillation structures shown in FIG. 3.

A more extensive modification to the reaction with distillation structure 100 shown in FIG. 3 is illustrated with reference to FIG. 5. In FIG. 5, alternating layers of reaction with distillation structures 160 and 170 are provided and are configured to provide for a double-pass flow scheme in contrast to the single-pass scheme illustrated in FIG. 3. Structures 160 comprise a pair of generally coplanar trays 130, each of which has a catalyst container 132 positioned at the end thereof and is similar to the structures 100 in FIG. 3. The structures 160, however, are oriented so that the containers 132 are centrally positioned in spaced apart relationship. The spacing between those containers 132 forms a central bypass or downcomer 144 into which liquid flows and accumulates as it overflows the tops of the containers. Accumulation of liquid in downcomer 144 is preferably achieved by providing limited clearance between the container bottoms 138 and the underlying tray 130. The imperforate bottoms 138 of containers 132 may optionally be extended into the downcomer 144 to restrict the opening at the bottom end thereof and facilitate the accumulation of liquid within the downcomer. This accumulating liquid develops a liquid head which forces the liquid laterally through the catalyst beds in both associated containers 132. It will be appreciated that the laterally flowing liquid will also gravitate downwardly under the influence of gravity and the influence of liquid flowing downwardly within the catalyst bed from above. The resultant directional flow of the liquid may thus be only generally horizontal. Advantageously, the laterally flowing liquid travels a shorter distance and encounters less flow resistance than that liquid entering containers 132 through covers 140 and the hydraulic capacity of the containers is correspondingly increased.

Liquid is directed from each structure 160 to the immediately underlying structure 170 which has catalyst containers 132 positioned at both ends of a single tray 130. Liquid which accumulates on the tray 130 of structure 170 is directed through either of containers 132 on the ends of tray 130 or through the downcomers 144 positioned between each container 132 and the column shell 112. This double-pass arrangement can accommodate greater liquid flow and more catalyst than the single-pass configuration of FIG. 3. It will be appreciated that three-pass, four-pass, five-pass or large arrangements are possible for increasingly greater liquid handling and catalyst containing capacities.

Figure 6:
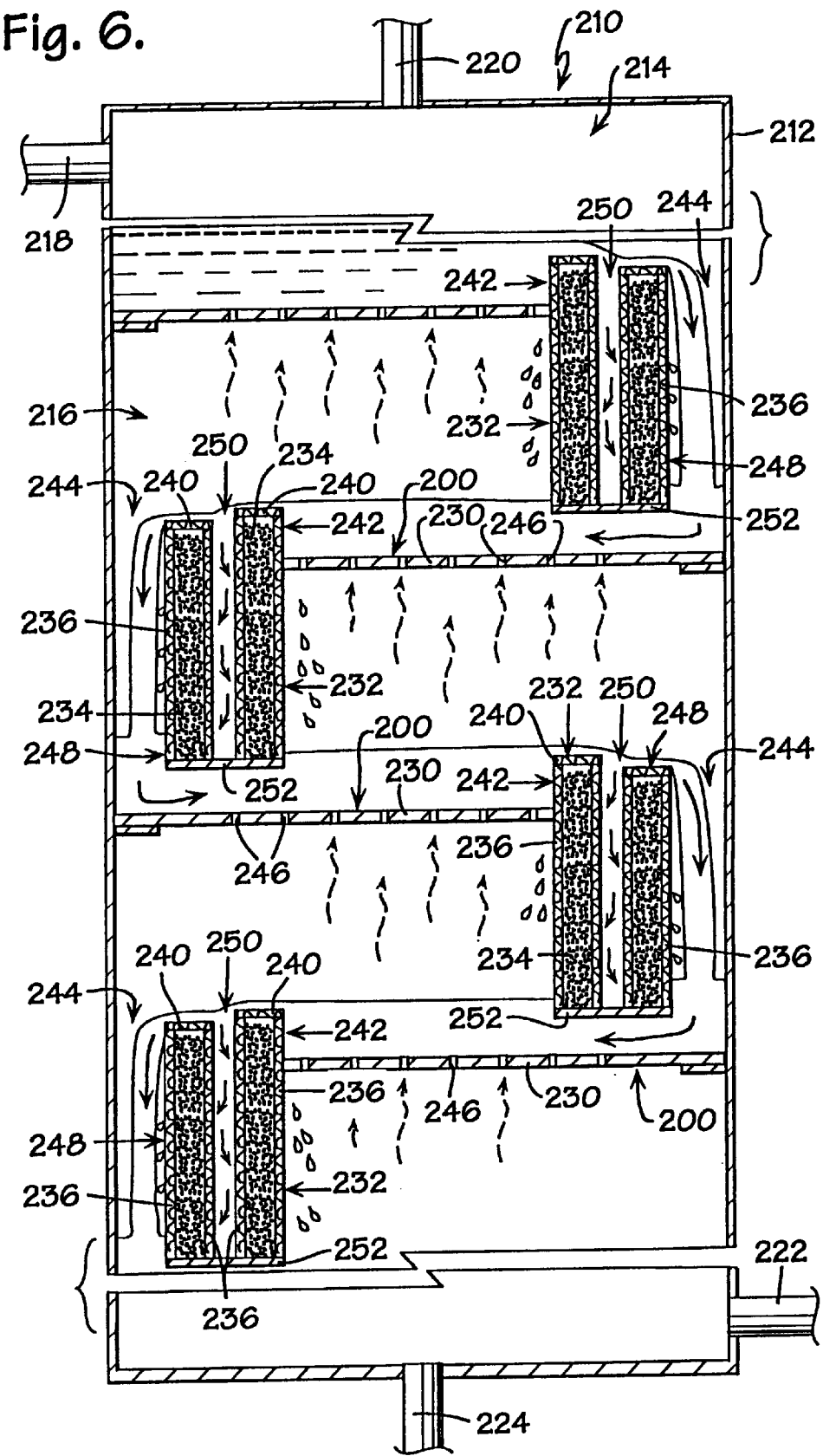
FIG. 6 is a fragmentary side elevation view of a column taken in vertical section and showing a further embodiment of a reaction with distillation structure of the present invention.

A further embodiment of a reaction with distillation structure in accordance with the present invention is shown in FIG. 6 and is represented by the numeral 200. Like reference numerals are again used to designate like parts from the other embodiments but are preceded by the prefix "2". Each reaction with distillation structure 200 is similar to the structures 100 shown in FIG. 3 except that a second catalyst container 248 is spaced downstream from the catalyst container 232 positioned at the end of each tray 230. The spacing between the containers 248 and 232 creates a region or zone 250 which is open at the top to accommodate the flow of liquid into the zone 250 as it overflows the top of container 232. The zone 250 is preferably closed at the bottom by an imperforate plate -252 which prevents liquid from flowing out of the bottom of zone 250. The liquid flowing into the zone 250 is thus forced to accumulate in zone 250 and can exit therefrom only by flowing through the catalyst beds within containers 248 and 232. Notably, the liquid flowing through the spaced apart catalyst beds encounters less resistance to flow than it would encounter if it were to flow through a catalyst bed having the combined thickness of the beds provided in containers 248 and 232.

In certain applications it may be desirable to provide plate 252 with a limited number of perforations to allow a portion of the liquid within zone 250 to flow through plate 252 while still forcing other portions of the liquid through containers 248 and 232, respectively.

Each structure 200 also includes a bypass or downcomer 244 such as previously described. The downcomer 244 is formed by the adjacent side wall 236 of container 248 and the walls of column shell 212. Preferably, liquid is prevented from accumulating in downcomer 244 so that it does not counteract the pressure generated by the liquid accumulating in zone 250 and thereby reduce the flow of liquid from zone 250 through container 248. This can be accomplished by spacing the lower surfaces of the containers 248 and 232 sufficiently above the underlying tray 230 or by limiting the volume of liquid flow entering the downcomer 244. In certain applications, the flow capacity of containers 248 and 232 may be sufficient to accommodate all of the liquid flowing on tray 230. In such applications, no liquid would overflow into downcomer 244 but liquid would still enter the downcomer 244 after passing laterally through container 248.

Reaction with distillation structures 200 provide the same advantages previously described with respect to reaction with distillation structures 28 and 100; namely, enhanced mass transfer and catalyst performance as well as increased hydraulic capacity. In addition, the use of spaced-apart containers 248 and 232 increases the surface area of the catalyst beds through which the liquid flows and decreases the distance that the liquid must flow in comparison to a single container having twice the thickness of containers 248 and 232. The spaced apart containers 248 and 232 thus significantly reduce the resistance to fluid flow and permit a greater volumetric flow of liquid to be achieved.

Figure 7:
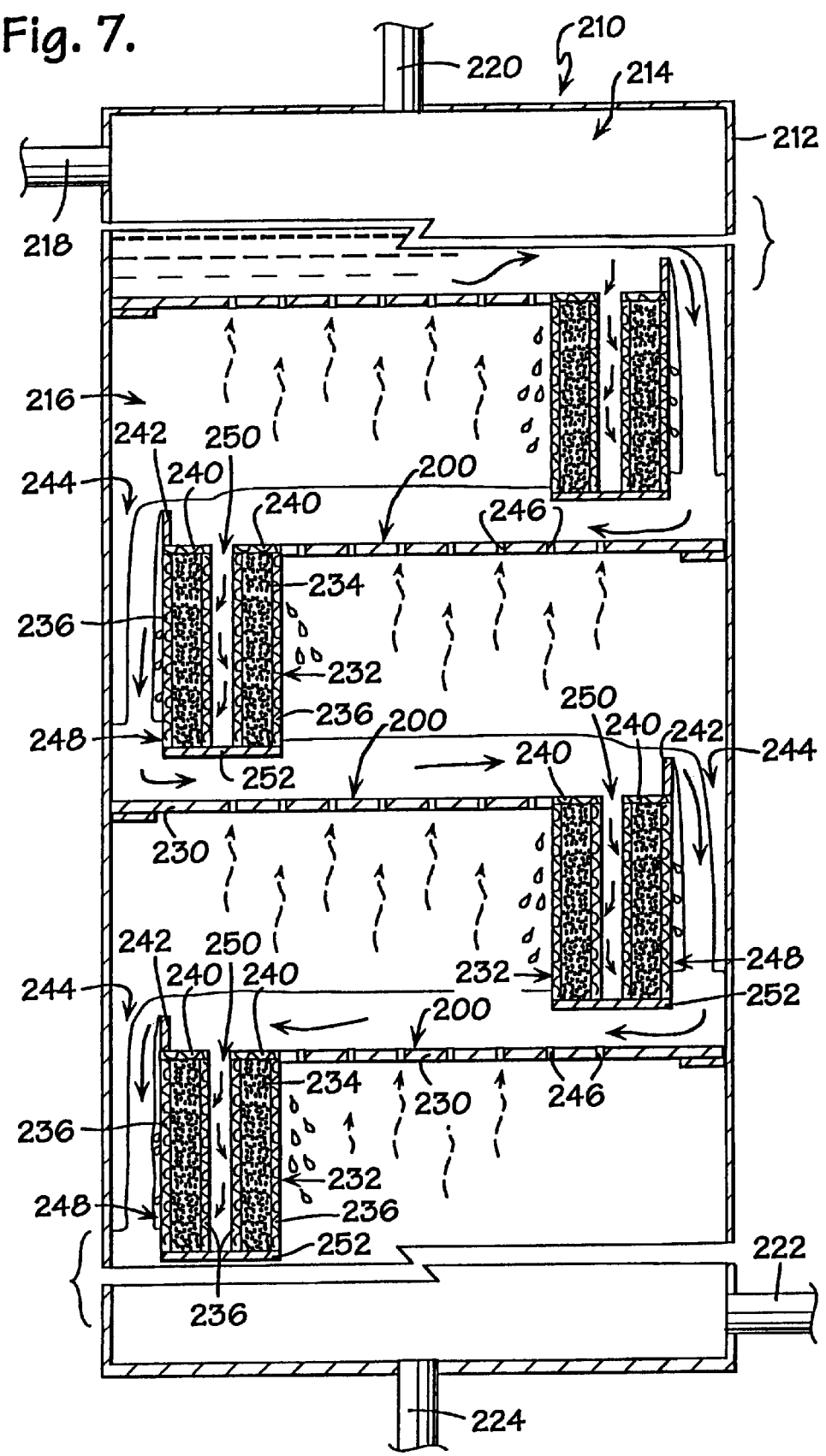
FIG. 7 is a fragmentary side elevation view of a column taken in vertical section and showing a reaction with distillation structure similar to that shown in FIG. 6 but with the tops of the catalysts containers shown level with the associated trays and plate-type overflow weirs being provided to cause liquid accumulation on the trays.

The reaction with distillation structures 200 of FIG. 6 are shown in a modified form in FIG. 7 wherein the tops of the containers 232 and 248 do not extend above the surface of tray 230. Instead, a solid plate 242 extends upwardly from the downstream side wall 236 of container 248 to form an overflow weir. It will be appreciated that the plate 242 could alternatively extend upwardly from upstream catalyst container 232 if desired.

Figure 8:
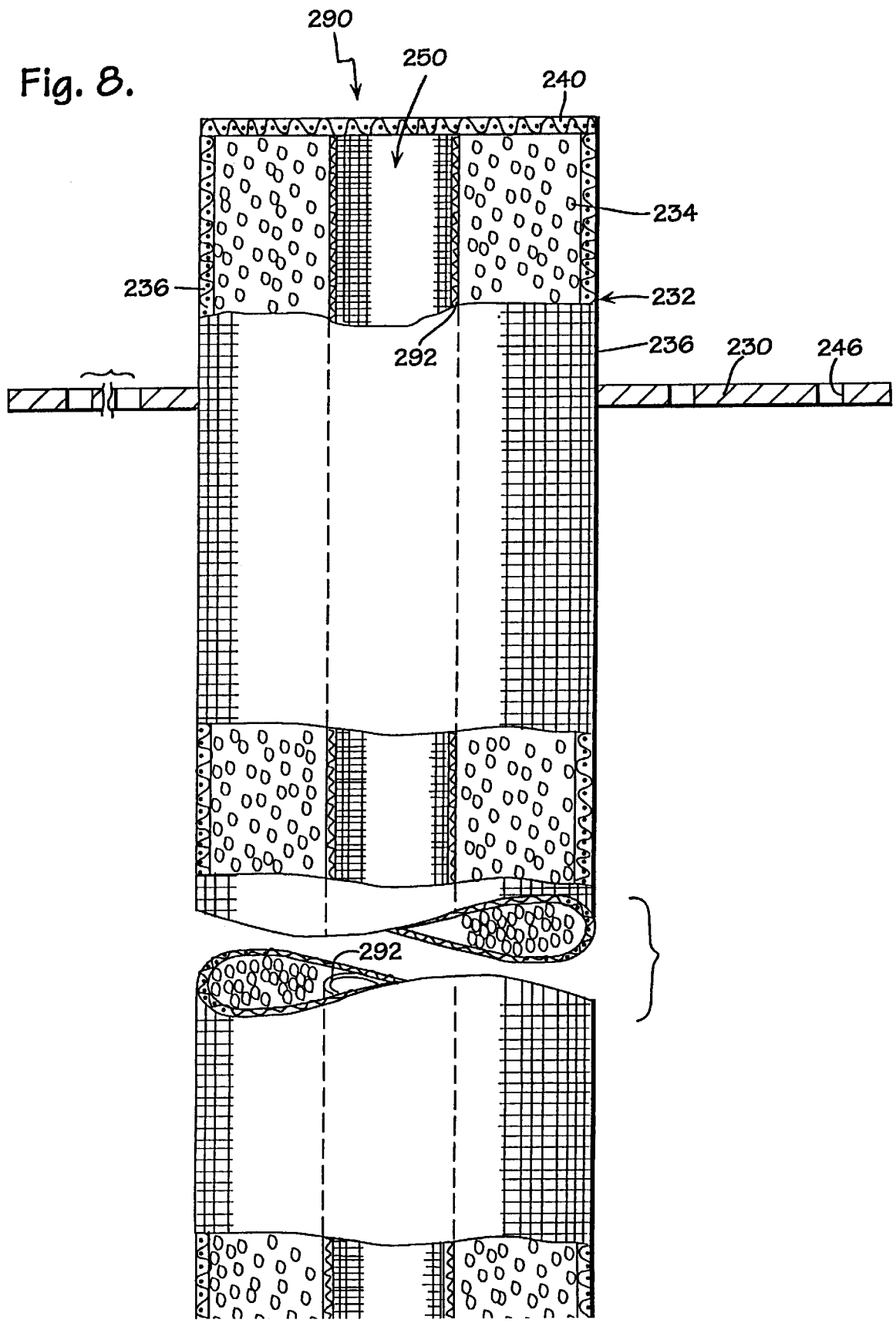
FIG. 8 is an enlarged fragmentary side elevation view of a reaction with distillation structure employing a cylindrical catalyst container, portions of the structure being taken in vertical section and other portions being broken away for purposes of illustration.

Turning now to FIG. 8, a reaction with distillation structure 290 is provided which utilizes a plurality of catalyst containers, only one of which is illustrated and is designated by the numeral 232, which are similar to those previously described except they are cylindrical in configuration. The container 232 has a perforate outer side wall 236 and a zone 250 is formed within container 232 by a cylindrical member 292 which also forms the inner side walls of container 232. The annular region between the member 292 and the outer side wall 236 is filled with catalyst particles 234 and the member 292 is perforate to accommodate the passage of liquid between the zone 250 and the catalyst bed formed by the catalyst particles 234.

The zone 250 is open at the top to permit the flow of a portion of the liquid from the tray 230 into the zone 250 without passing through the surrounding catalyst bed. The bottom of zone 250 is shown closed by an imperforate plate 252 which forces liquid entering zone 250 to accumulate and exit through the surrounding catalyst bed in container 232 under the influence of the liquid head created by the accumulated liquid. While the zone 250 has been shown extending to the bottom of the catalyst bed, it need not necessarily do so. Instead, the zone 250 may extend downward into the catalyst bed and terminate above the bottom edge of the catalyst bed. In some applications, the plate 252 may contain a limited number of perforations to allow a portion of the liquid to exit zone 250 through the plate 252 without passing through the catalyst bed. In other applications, plates 252 may be provided on only some of the containers 232. The zone 250 in those containers 232 which lack plates 252 thus functions as an open downcomer which allows liquid entering zone 250 to pass to an underlying tray 230 without passing through the catalyst bed. Liquid can be caused to accumulate on tray 230 by extending the container 232 above the top surface of tray 230 as illustrated or by using a cylindrical solid plate as an overflow weir. If a solid plate is used as an overflow weir, the top of the catalyst bed may be positioned below the level of the tray 230. In such a configuration, the solid plate should be extended below the level of the tray a sufficient distance so that it overlaps the top portion of the catalyst bed.

Reaction with distillation structure 290, employing cylindrical catalyst containers 232, can be utilized in a manner like that previously described with reference to other structures, such as structures 200, and has the attendant advantages. Structure 290 is particularly adapted for use in processes which do not require a large amount of catalyst for effecting catalytic reaction of the liquid stream.

Figure 9:
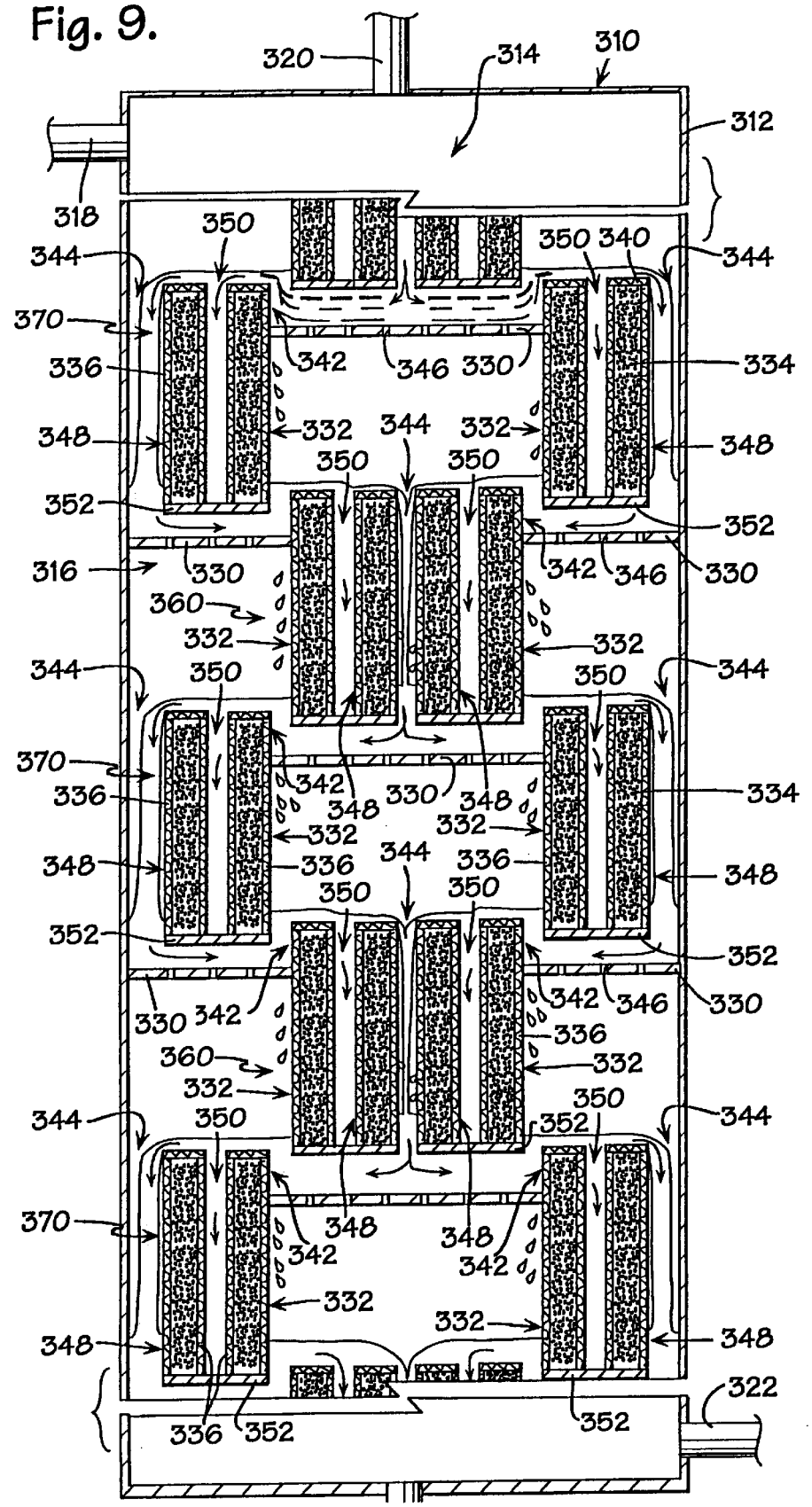
FIG. 9 is a fragmentary side elevation view of a column taken in vertical section and showing a combination of different reaction with distillation structures forming a double-pass version of the arrangement shown in FIG. 6.

Still further embodiments of reaction with distillation structures, broadly designated by the numerals 360 and 370, are shown in FIG. 9 which is a double-pass version of the arrangement shown in FIG. 6. Like reference numerals preceded by the prefix "3" have been utilized to refer to components previously described. Structures 360 and 370 are placed in alternating layers within region 316 of column 310 and are generally arranged so that liquid flowing from each structure will encounter a tray 330 of an immediately underlying structure. This arrangement serves to minimize the opportunity for liquid to bypass any of structures 360 and 370 as it descends through region 316.

Structure 360 is similar in construction to structure 200 shown in FIG. 6 except that a second pair of catalyst containers 332 and 348 and an associated tray 330 are utilized with each structure 360. Each structure 360 is arranged so that the pairs of catalyst containers 348 are centrally positioned with the associated trays 330 extending from the containers 332 to the column shell 312. The catalyst containers 332 and 348 are generally rectilinear in configuration and extend partially or completely between opposed sides of shell 312. The containers 332 and 348 may, however, be constructed in other configurations from that described and illustrated.

As previously described, a catalyst feed region 350 which is open at the top to the flow of liquid is formed between each pair of catalyst containers 332 and 348. In addition, a bypass or downcomer 344 is formed in the spacing between the innermost containers 348 so that liquid which flows over the tops of containers 348 is directed into the downcomer 344 once the catalyst feed regions 350 are filled. In order to prevent vapor from flowing upwardly through the downcomer 344, a suitable static seal is provided. In order to permit the flow of liquid from within the adjacent containers 348 into the downcomer 344, it is preferred that the liquid backup in downcomer 344 only fills a lowermost portion of the downcomer.

Liquid is directed from downcomer 344 of structure 360 through the central opening in plate 352 and encounters the underlying reaction with distillation structure 370. Structure 370 is generally a two-pass version of the structure 200 shown in FIG. 6. Each structure 370 thus includes a central tray 330 with a pair of spaced apart catalyst containers 332 and 348 which are positioned at both ends of the central tray 330. Liquid on. structure 370 is received generally centrally and is then forced to flow outwardly along tray 330 toward either end thereof. Liquid then can either enter container 348, region 350, container 332 or downcomer 344 for passage to the underlying tray 330 of structure 360.

Reaction with distillation structure 360 has, in addition to the benefits presented by the structures previously discussed, the added advantage of increasing the amount of liquid flow which can be directed through the catalyst beds within containers 332 and 348. This is accomplished by utilizing four separate catalyst packed containers within each structure 360 and permitting lateral flow of liquid through each container. The number of containers used in each structure is not limited to four but may include more than that number. Flow volume through the catalyst beds is also increased by the use of multiple feed regions 350 which must be filled before liquid will enter the central downcomer 344. This ensures that a maximum liquid head is always available to drive the liquid laterally through the catalyst beds associated with the regions 350. Notably, in some applications the hydraulic capacity of the catalyst beds will be sufficient to accommodate the entire volumetric flow of liquid descending through the reaction with distillation region 316. Even greater liquid handling and catalyst containing capacities can be obtained by arranging the structures 360 and 370 to provide a three-pass, four-pass or greater configuration.

While containers 332 and 348 are shown positioned so that their covers 340 extend above the top surface of trays 330 to form overflow weirs 342, it will be appreciated that a solid upright plate may instead be provided for this purpose. The plate could be placed upstream from the containers, such as at the edge of the tray 330, or downstream at the edge of downcomer 344, or anywhere in between if desired.

Figure 10:
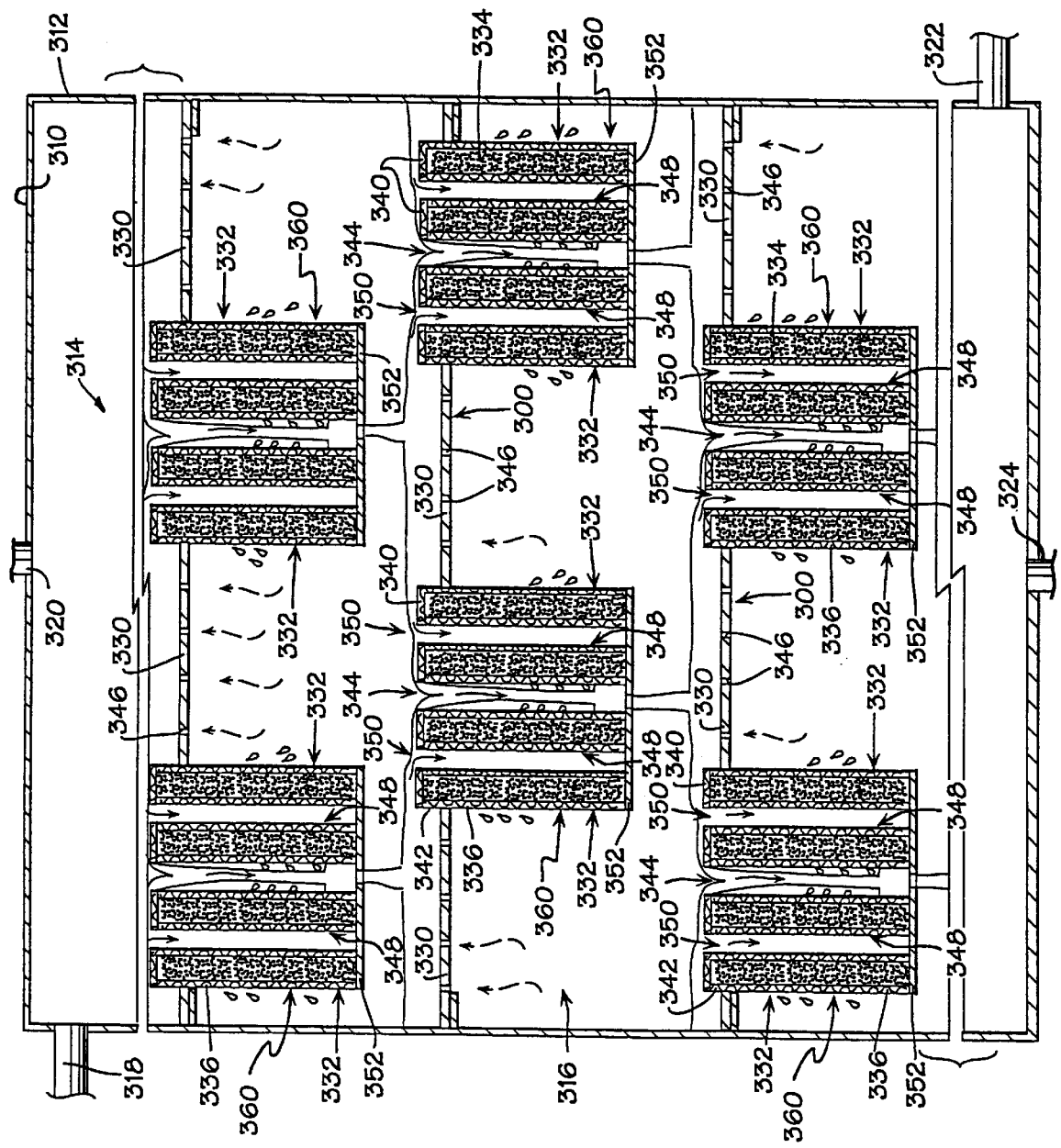
FIG. 10 is a fragmentary side elevation view of a column taken in vertical section and showing a different arrangement of one of the types of reaction with distillation structures illustrated in FIG. 9.

Turning now to FIG. 10, it can be seen that multiple reaction with distillation structures 360 can be provided at each level within column region 316. As previously described, each structure 360 comprises two pairs of catalyst containers 332 and 348 and a portion of an associated tray 330. A catalyst feed region 350 is formed between each pair of containers 332 and 348 and a downcomer 344 is provided between the paired containers 332 and 348. Preferably, in the structure 360 which is placed closest to shell 312 at each level, the containers 332 and 348 are sized so that they do not extend completely between the opposed sides of the shell 312. This permits a portion of the liquid on associated tray 330 to travel around the ends of the containers 332 and 348 to feed the narrow tray portion which extends between the shell 312 and the side wall 336 of the container 332 which is nearest the shell 312.

The structures 360 are positioned in a vertically staggered arrangement so that the discharge from each downcomer 344 contacts the tray 330 of an underlying structure. This arrangement reduces the opportunity for liquid to bypass a level of structures and the associated mass transfer which occurs at each level. While only two structures 360 have been shown at each level within region 316, in many applications it will be desirable to use more than two such structures to provide a multiple-pass arrangement. It will be appreciated that the mass transfer performance of the structures 360 is reduced as the tray 330 is reduced in area and divided into numerous smaller segments by the multiple containers 332 and 348. Accordingly, the increased liquid flow rate and catalyst capacity which can be achieved by placement of a number of structures 360 at each level must be balanced against the accompanying decrease in mass transfer performance which can be obtained.

Figure 11:
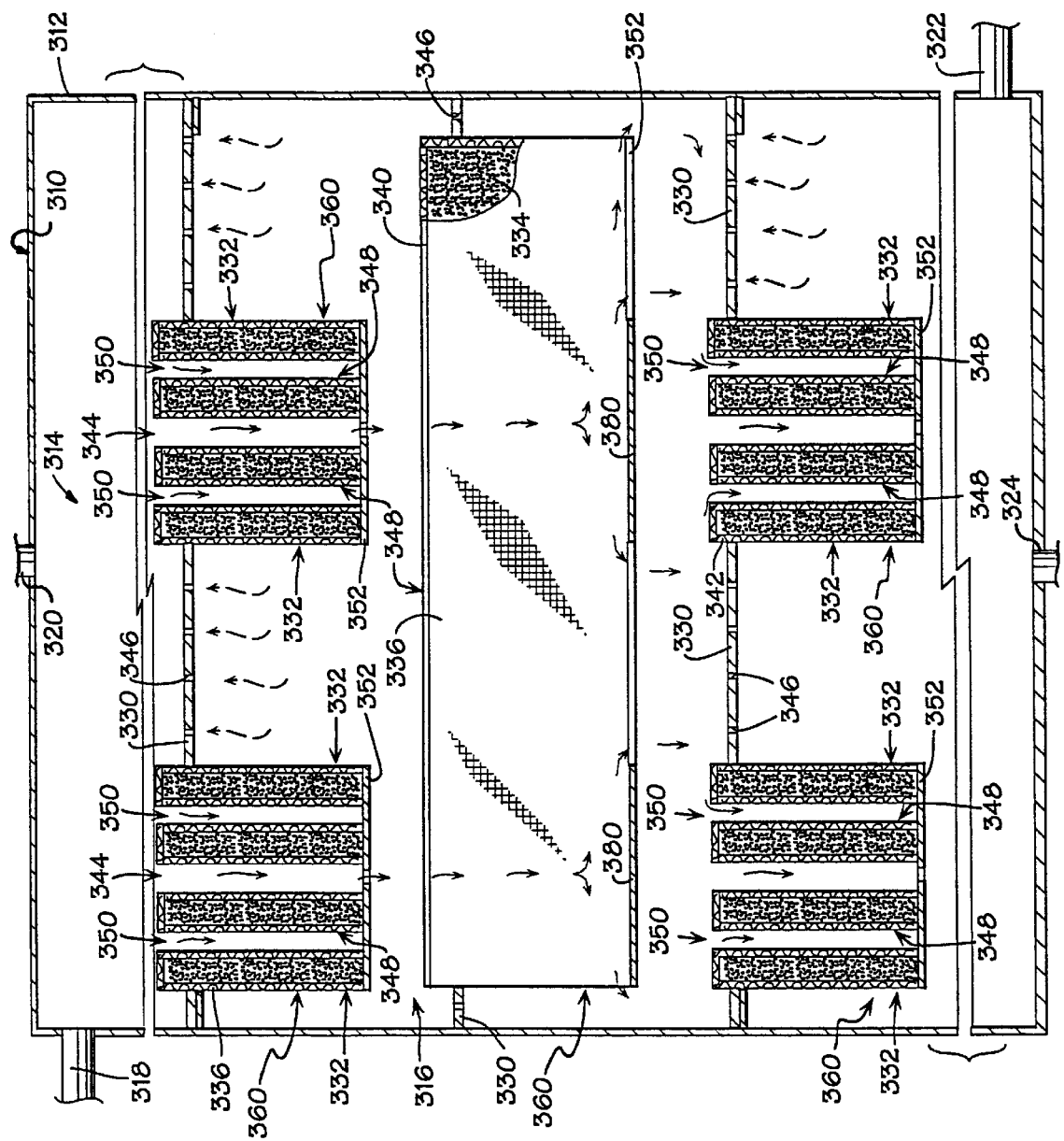
FIG. 11 is a fragmentary side elevation view of a column taken in vertical section and showing a further arrangement of the reaction with distillation structures shown in FIG. 1.
Figure 12:
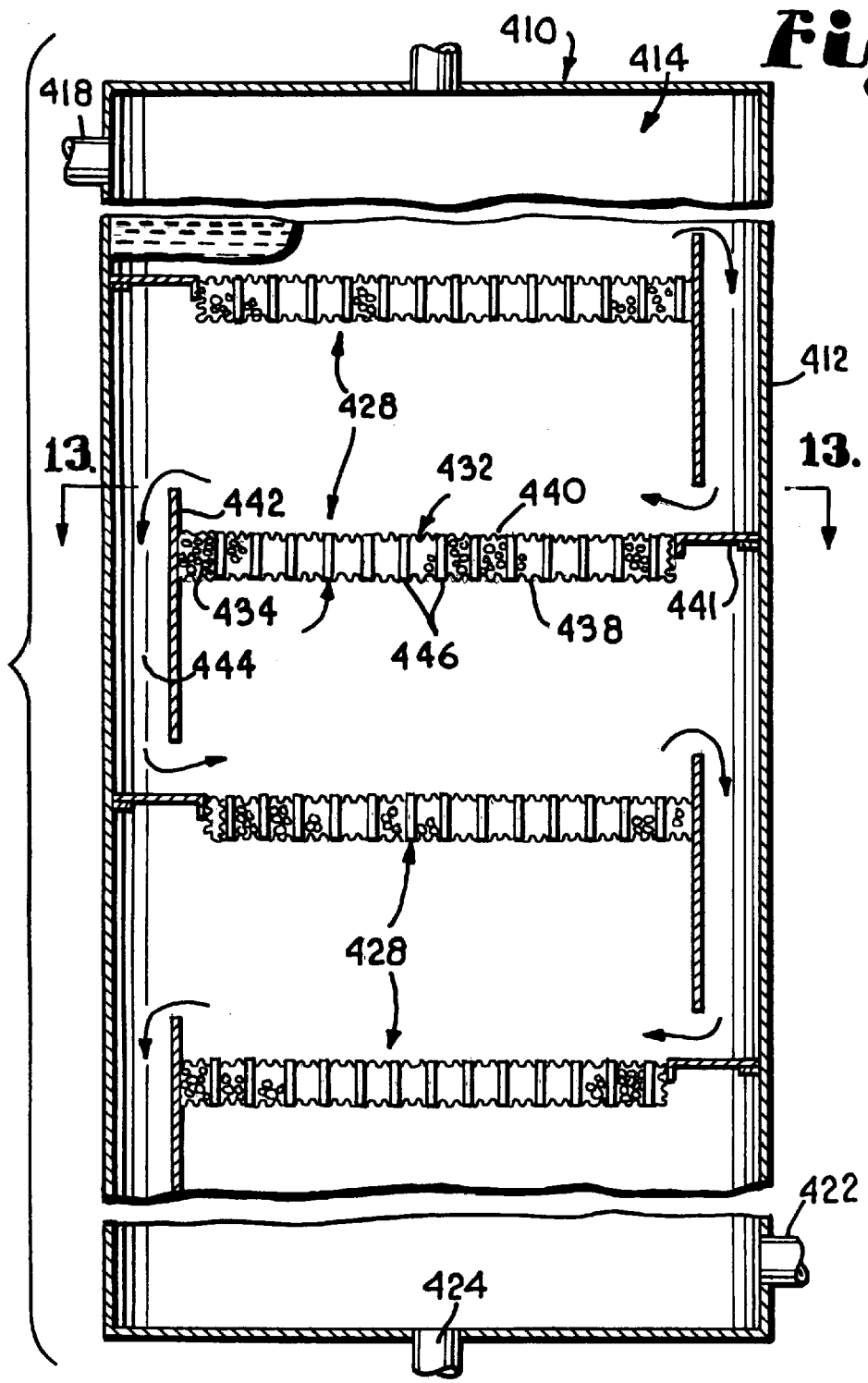
FIG. 12 is a fragmentary side elevation view of a column taken in vertical section and showing a still further embodiment of a reaction with distillation structure of the present invention.
Figure 13:
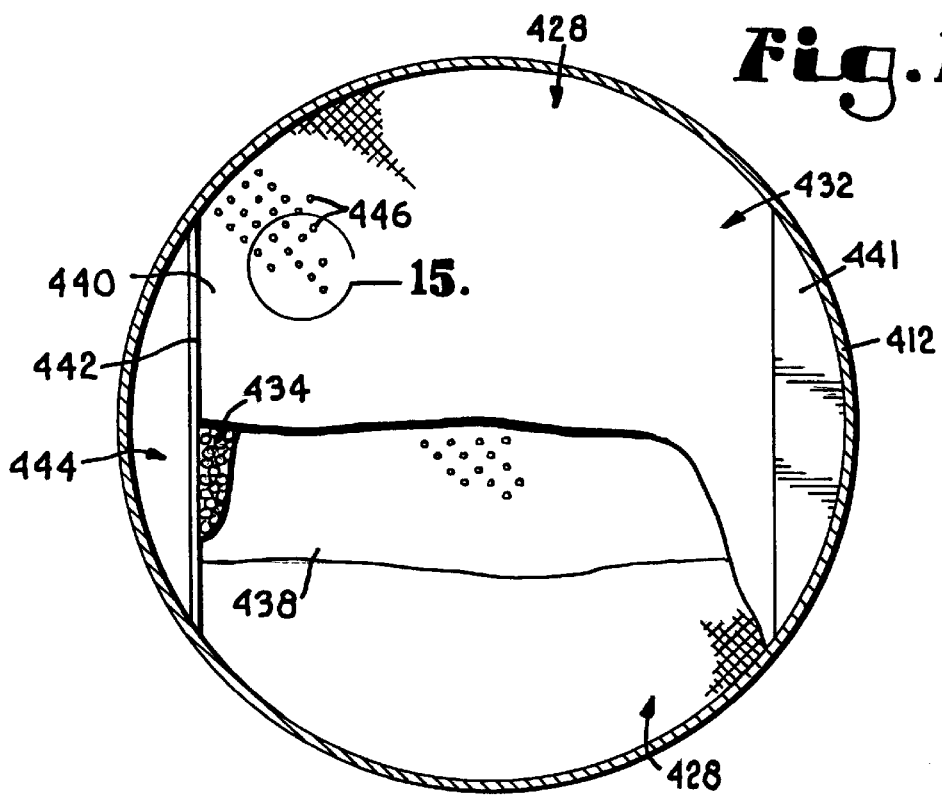
FIG. 13 is a top plan view of one of the reaction with distillation structures shown in FIG. 12 taken in horizontal section along line 13—13 of FIG. 12 in the direction of the arrows, portions of the structuring being broken away to illustrate the construction thereof.
Figure 14:
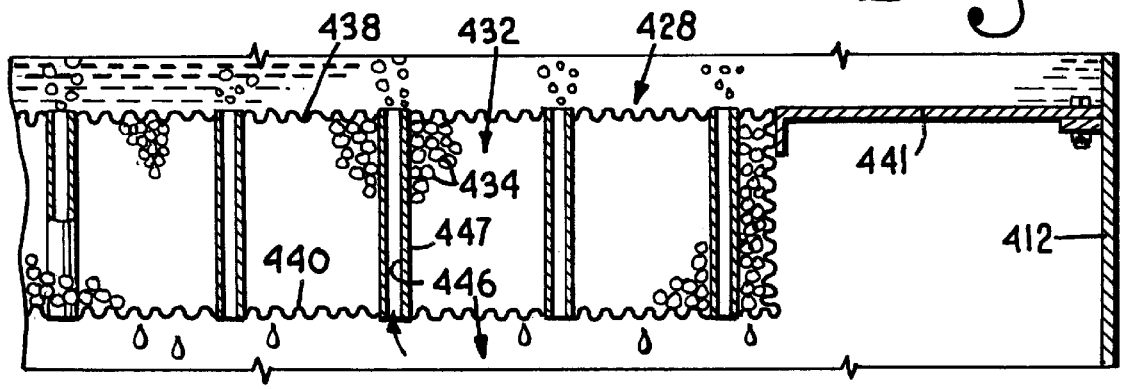
FIG. 14 is an enlarged fragmentary side elevation view of the structure of FIG. 13 showing liquid flowing across an upper surface of the structure and vapor ascending through passages in the structure for interaction and mass transfer with the liquid flowing across the upper surface.
Figure 15:
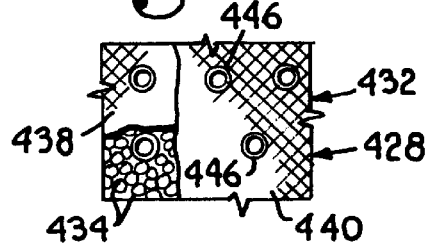
FIG. 15 is an enlarged top plan view of the structure taken from FIG. 13 with portions of the structure being broken away to further illustrate the construction thereof.

While the horizontal longitudinal axes of the containers 332 and 348 in adjacent levels of structures 360 have been shown in parallel alignment in FIG. 10, in some applications it may be desired or preferred that they extend at angles up to and including 90°, such as is shown in FIG. 11. In FIG. 11, the longitudinal axes of containers 332 and 348 at one level extend at right angles to the longitudinal axes of containers 332 and 348 in adjacent levels. In order to prevent liquid from passing from the downcomer 344 discharge at one level directly into the open top of an underlying downcomer 344, an imperforate plate 380 can be provided to close the bottom of each downcomer along that portion which lies directly over the inlet of an underlying downcomer. Preferably, the plate 380 is sized large enough to divert the liquid discharge away from the underlying regions 350 and containers 332 and 348 as well. Various other alternative arrangements are possible to reduce the amount of liquid which bypasses mass transfer at each level of structures 360.

Turning now to FIGS. 12–15, a yet further embodiment of a reaction with distillation structure of the present invention is illustrated and is represented generally by the numeral 428. A plurality of structures 428 are vertically spaced apart within column 410 and reference numerals preceded by the prefix "4" are utilized to designate components which are like those previously described.

Structures 428 are similar to structures 28 previously described except that each structure 428 contains a single horizontally elongated catalyst-filled container 432 rather than multiple spaced apart catalyst-filled troughs 32 which are supported by a tray 30. Each container 432 contains a horizontally continuous catalyst bed such as formed from catalyst particles 434. The container 432 comprises an upper surface which is formed by a perforate cover 440 formed from material such as screening or other mesh-like material which permits the downward passage of liquid into the underlying catalyst bed or particles 434. The container 432 includes a lower surface formed from a perforate bottom 438 which may also be formed from materials such as screening or other mesh-like material to permit the downward passage of liquid from the container 432. Although the cover 440 and bottom 438 are preferably formed of a mesh-like material such as gauze or screen made of woven wire, plastics or ceramics, it will be appreciated that other types of materials which are liquid permeably can be used. For example, one or both of the cover 440 and bottom 438 can be formed of metal sheets in which perforations are placed to permit the passage of liquid. Regardless of the material selected, the catalyst particles 434 must be retained between and prevented from passing through the cover 440 and bottom 438, including when the container 432 is flooded with liquid. The sides of containers 432 can be closed in any suitable manner such as by using the material chosen for the cover 440 or bottom 438.

The containers 432 have a thickness and surface area selected to ensure that the desired quantity of liquid enters the catalyst bed formed by catalyst particles 34 to undergo catalytic reaction. It will be appreciated that the hydraulic capacity of the containers 432, that is the amount of liquid that will permeate or be forced by gravity through the catalyst bed during processing operations, increases with increasing container surface area and decreases with increasing catalyst bed thickness. By sizing the containers 432 to substantially fill the horizontal cross section of the column 410, the catalyst bed thickness can be reduced, thereby increasing the hydraulic capacity of the containers 432 while still providing the desired catalytic reaction of the liquid stream.

In order to accommodate upward vapor passage through the containers 432, a plurality of vapor passages 446 are provided and extend upwardly through the container bottom 438, catalyst particles 434 and cover 440. The vapor passages 446 may extend generally vertically or they may be inclined at an angle, including multiple angles, from the vertical. The vapor passages 446 can be formed in any suitable manner and each preferably comprises a generally vertical outer wall 447 which defines an upward vapor flow path and prevents entry of the catalyst particles 434 into the vapor flow path so that the flow path is substantially free of catalyst. The walls 447 may be of cylindrical or other desired configuration and may also be impermeable to the flow of liquid to prevent liquid from flowing horizontally from the catalyst bed into the vapor flow path. The passages 446 are open at their upper and lower ends and are sized so that the force of the ascending vapor prevents entry of liquid from the container cover 440 into the passages 446. It will be appreciated that suitable devices such as bubble caps or valves may be used to prevent liquid on the container cover 440 from entering the upper ends of the vapor passages 446.

The vapor passages 446 are uniformly placed about the container 432 so that ascending vapor can be uniformly distributed as it passes through the containers 432 and interacts with the liquid flowing across the container cover 440. The vapor flow area of each passage 446, i.e. the area within wall 447, will typically be within the range of approximately 0.05 to 2.0 square inches. In general, the passages 446 are of a size and spacing so that together they comprise between approximately 5 to 25% of the horizontal cross-sectional area of containers 432.

Each reaction with distillation structure 428 further includes at least one downcomer 444 which is positioned so that a portion of the liquid on each structure 428 may pass to an underlying structure through the downcomer 440 and without passing downwardly through associated container 432. The downcomers 444 can be positioned at opposite ends of adjacent containers 432 so that the liquid must pass completely across each container cover 440 before entering the downcomer for passage to the lower structure 428. In order to prevent liquid from exiting the downcomer 444 directly onto an underlying container 432, each structure 428 may also be provided with an optional seal pan 441 underlying the downcomer 444 outlet. It will be appreciated that the seal pan 441 may not be necessary or desired in certain applications and can be replaced by extending the container 432 into that area underlying the downcomer 444 outlet. If the container 432 is extended in this manner, it is preferred that no vapor passages 446 be located directly underneath the downcomer outlet in order to reduce the opportunity for liquid to be forced through the vapor passages 446 as it exits the downcomer. If vapor passages 446 are placed in that portion of the container 432 underlying the downcomer 444, bubblecaps or other devices may be used in association with the vapor passages to reduce the opportunity for liquid to be forced downward through the passages upon existing the downcomer.

A weir 442 may also be positioned to cause more liquid to accumulate above each container 432 and develop a liquid head which forces liquid downwardly through the containers 432 for catalytic reaction. The weir 442 may comprise a vertical extension of downcomer 444 but, as previously described, the placement and configuration of the weir and downcomer can be varied as desired and may include cylindrical structures distributed across the containers 432. It is to be understood that the weir 442 may not be necessary or desired in certain applications.

It can thus be seen that structure 428 is similar in construction and operation to structure 28 previously described except each catalyst-filled container 432 extends across the horizontal cross section of column shell 412 and the vapor passages 446 extend through the containers 432. Because the vapor passages 446 are provided within the container 432 itself, the container need not be divided into a number of horizontally spaced apart containers with a sieve-type tray used to permit upward passage of the vapor as required by structure 28. This then allows the catalyst-filled container to fill that portion of the horizontal cross-section of structure 428 which would otherwise be dedicated to the sieve tray and thus unavailable for downward passage and catalytic reaction of liquid. The structure 428 thus increases the amount of liquid presented to the catalyst bed for catalytic reaction while maintaining and even increasing the overall hydraulic capacity of the structure 428 and column 410.

Figure 16:
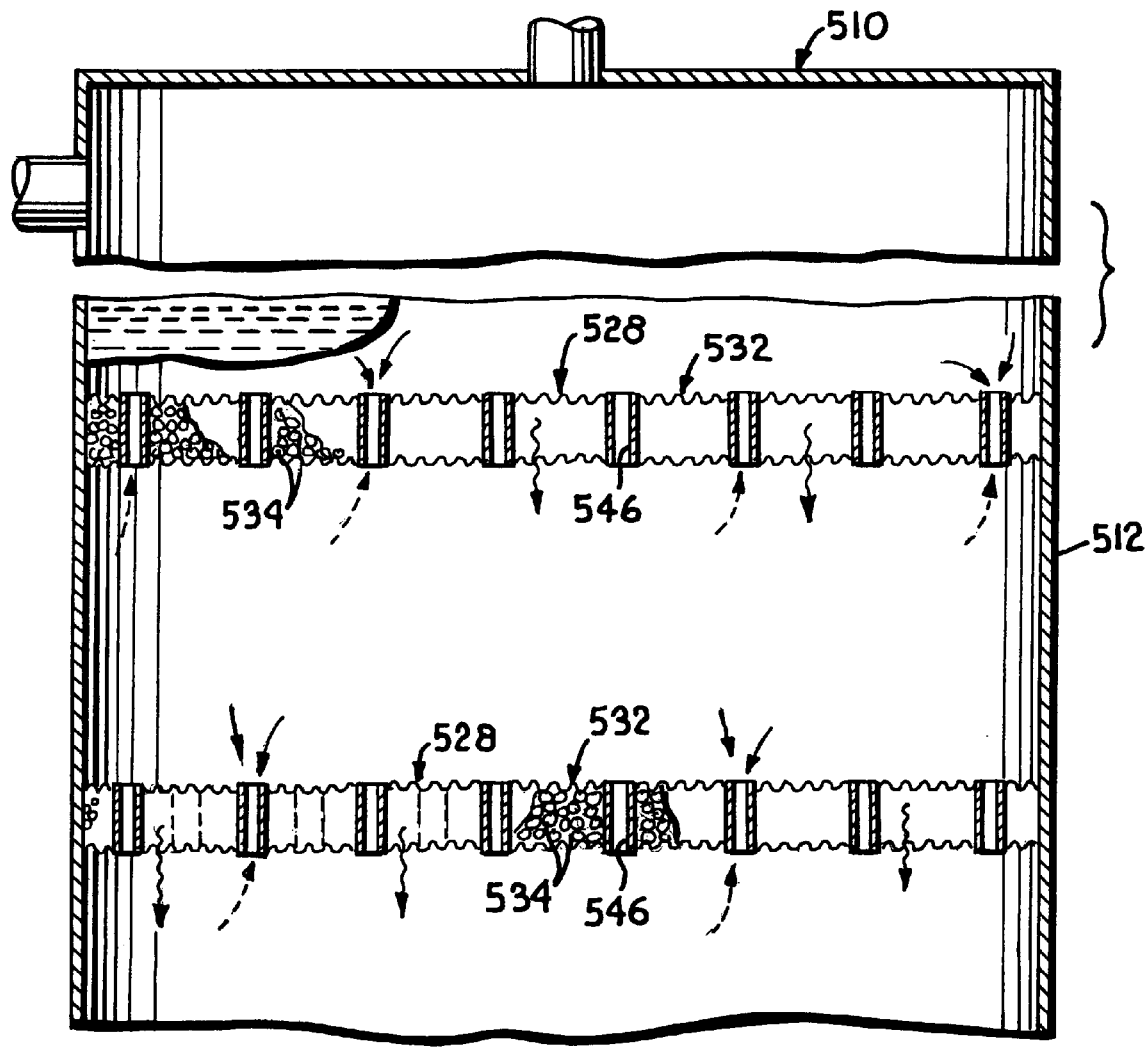
FIG. 16 is an side elevation view of a column taken in vertical section and showing a variation of the structure shown in FIG. 12.
Figure 17:
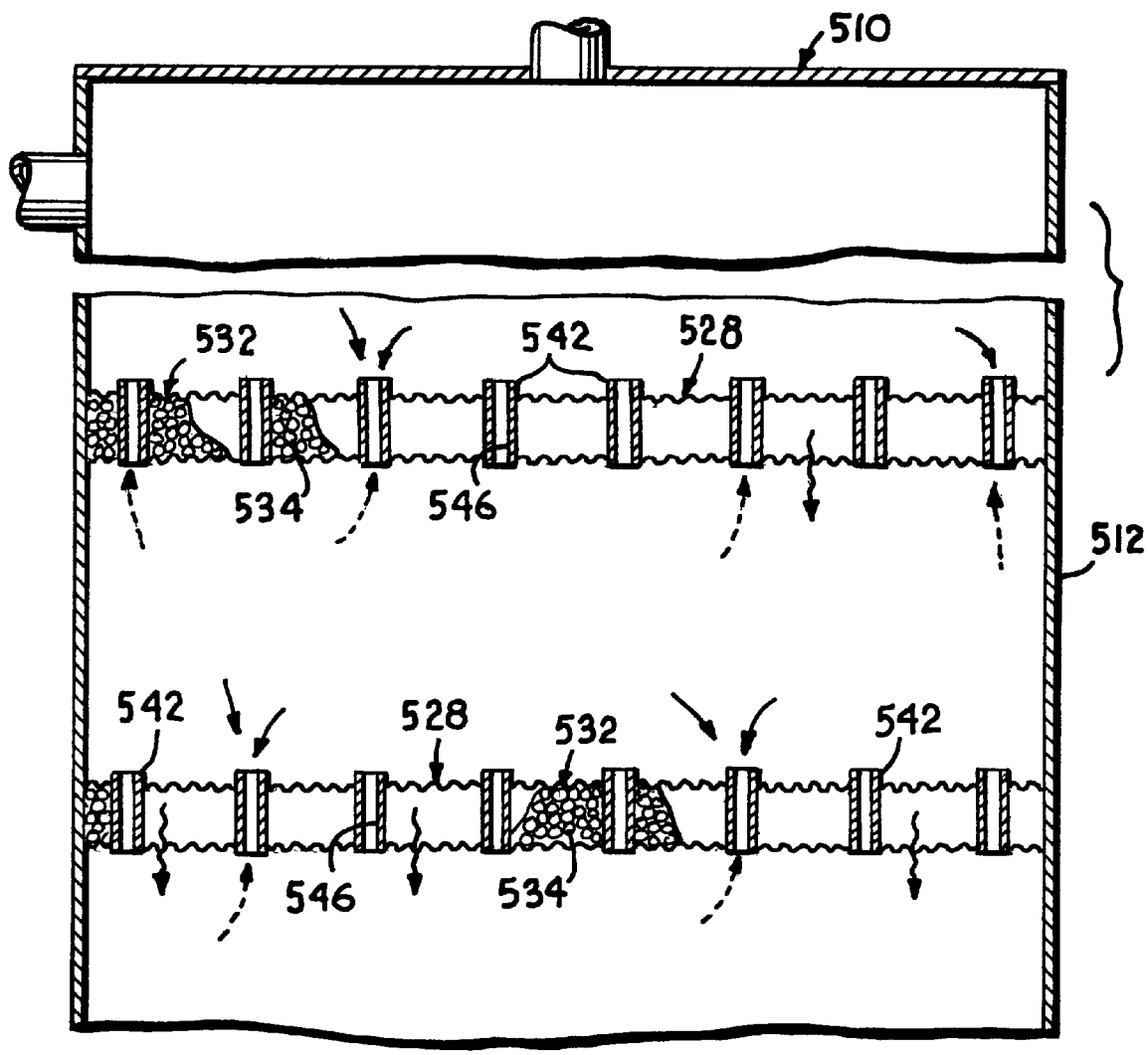
FIG. 17 is a side elevation view showing a further variation of the structure shown in FIG. 16.

A variation of structure 428 is illustrated in FIG. 16 and is designated by the numeral 528. Each structure 528 comprises a single horizontally elongated catalyst-filled container 532 which completely fills the horizontal cross section of the column 510. The containers 532 are identical to those containers 432 previously described except the passages 546 are of a size to accommodate the downward flow of liquid as well as the upward flow of vapor. The passages 546 are sized to provide the desired vapor and hydraulic capacity for the structures 528, with the sizing determined in part by the liquid permeability through the catalyst 534. The horizontal cross-sectional area of each passage 546 will typically be within the range of approximately 0.1 to 3.0 square inches, with the total cross-sectional area of the passages 546 in each container 532 comprising between approximately 5 to 40% of the horizontal cross-section area of the container 532. Because the passages 546 are designed to accommodate liquid flow, separate dowmcomers are often unnecessary but could be utilized if desired. similarly, weirs 542, such as shown in FIG. 17, surrounding the passages 546 are not needed in many applications but could be used in certain instances if desired.

It can thus be seen that the structures 528 operate in substantially the same manner as structures 428 previously described except that a portion of the liquid on each structure 528 passes downwardly through vapor/liquid passages 546 rather than through downcomers which are dedicated solely to liquid flow.

It will be appreciated that numerous modifications to the reaction with distillation structures, as well as their placement, can be made and remain within the scope of the present invention.

From the foregoing, it will be seen that this invention is one well adapted to attain all the ends and objects hereinabove set forth together with other advantagess which are inherent to the structure.

It will be understood that certa in features and subcombinations are of utility and may be employed without reference t o other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not limiting sense.

What is claimed is:

1. A method for operating a column to facilitate mass transfer between liquid and vapor streams flowing through the column and to effect catalytic reaction of the liquid stream concurrently with said lass transfer, comprising: providing a column containing a plurality of vertically spaced apart distillation structures, each of said distillation structure comprising a horizontally elongated container sized to fill a substantial portion of a horizontal cross section of the column and comprising an upper surface across which said liquid stream is able to flow, a lower surface, spaced below said upper surface, and a catalyst bed retained between said upper and lower surfaces, said upper and lower surfaces being permeable to the downward flow of said liquid stream, said container further comprising a plurality of passages substantially free of catalyst and extending through the upper surface catalyst bed and lower surface, of the container to allow upward passage of the vapor stream through the container, each of said passages being formed by an outer wall that defines a vapor flow path having a preselected horizontal cross-sectional area; supplying a liquid stream to one of said distillation structures and flowing said liquid stream along the upper surface of the associated container; directing a first portion of the flowing liquid stream downwardly through said container and catalyst bed for catalytic reaction to form a reaction product; directing a second portion of said flowing liquid stream from the associated container downwardly through a downcomer to an underlying distillation structure without passing through said catalyst bed, flowing at least part of said first and second portions of the liquid stream across the upper surface of the container of the underlying distillation structure after passage of said first portion downwardly through said catalyst bed and passage of the second portion downwardly through the downcomer; and directing a vapor stream upwardly through said passages in the containers for interaction and mass transfer with the liquid stream on the upper surfaces of the containers.

2. The method as set forth in claim 1, including accumulating said liquid stream on the one distillation structure using a weir associated with the container.

3. The process as set forth in claim 1, including uniformly distributing the vapor stream across the horizontal cross section on of the containers for said interaction and mass transfer the liquid stream.

4. The method as set forth in claim 1, including blocking said first portion of the flowing liquid stream from entering the passages from the catalyst bed by using a liquid impermeable material to form said outer wall that defines the vapor and liquid flow path.

5. The method as set forth in claim 1, including providing each of said vapor flow paths with said preselected horizontal cross-sectional area within the range of approximately 0.05 to 2.0 square inches.

6. A method for operating a column to facilitate mass transfer between liquid and vapor streams flowing through the column and to effect catalytic reaction of the liquid stream concurrently with said mass transfer, comprising: providing a column containing a plurality of vertically spaced apart distillation structures, each of said distillation structures comprising a horizontally elongated container sized to fill a substantial portion of a horizontal cross section of the column and comprising an upper surface, a lower surface spaced below said upper surface, and a catalyst bed retained between said upper and lower surfaces, said upper and lower surfaces being permeable to the downward flow of said liquid stream, said container further comprising a plurality of passages substantially free of catalyst and extending through the upper surface, catalyst bed and lower surface of the container to allow both upward passage of the vapor stream and downward passage of part of the liquid stream through the container, each of said passages being formed by an outer wall that defines a vapor and liquid flow path having a horizontal cross-sectional area within the range of approximately 0.1 to 3.0 square inches; supplying a liquid stream to one of said distillation structures on the upper surface of the associated container; directing a first portion of the liquid stream on the upper surface downwardly through said container and catalyst bed for catalytic reaction to form a reaction product; directing a second portion of said liquid stream from the upper surface of the associated container downwardly through said passages to an underlying distillation structure without passing through said catalyst bed; and directing a vapor stream upwardly through said passages in the containers at the same time as said second portion of said liquid stream is directed downwardly through said passages for interaction and mass transfer with the liquid stream on the upper surfaces of the containers.

7. The method as set forth in claim 6, including accumulating said liquid stream on the one distillation structure using weirs extending upwardly above said upper surface to a preselected height and surrounding said passages.

8. The method as set forth in claim 6, including providing a total of the horizontal cross-sectional areas of the flow paths in the range of approximately 5 to 40% of the horizontal cross-sectional area of the container.

9. The method as set forth in claim 6, including blocking said first portion of the liquid stream from entering the passages from the catalyst bed by using a liquid impermeable material to form said outer wall that defines the vapor and liquid flow path.

10. The method as set forth in claim 9, including providing a total of the horizontal cross-sectional areas of the vapor flow paths within the range of approximately 5 to 40% of the horizontal cross-sectional area of the container.

11. The method as set forth in claim 6, including uniformly distributing the vapor stream across the horizontal cross section of the containers by placement of said passages in a uniform distribution across the horizontal cross section of the containers.

12. The method as set forth in claim 6, including supplying said liquid stream to one of said distillation structures at a rate to cause said liquid stream to accumulate on the upper surface of the container.

* * * * *